US011202452B2

(12) United States Patent
Hofmann et al.

(10) Patent No.: US 11,202,452 B2
(45) Date of Patent: Dec. 21, 2021

(54) APPARATUS AND METHOD FOR CUTTING MEAT PRODUCTS INTO BLOCKS OF MEAT

(71) Applicant: Provisur Technologies, Inc., Chicago, IL (US)

(72) Inventors: Adrian Hofmann, Dinhard (CH); Michael C. Collins, East Calais, VT (US); Franz H. Koller, Kirchberg (CH)

(73) Assignee: PROVISOR TECHNOLOGIES, INC., Chicago, IL (US)

( * ) Notice: Subject to any disclaimer, the term of this patent is extended or adjusted under 35 U.S.C. 154(b) by 49 days.

(21) Appl. No.: 16/841,864

(22) Filed: Apr. 7, 2020

(65) Prior Publication Data

US 2020/0315191 A1  Oct. 8, 2020

Related U.S. Application Data

(60) Provisional application No. 62/830,820, filed on Apr. 8, 2019.

(51) Int. Cl.
*A22C 17/00* (2006.01)
*A22C 18/00* (2006.01)
(Continued)

(52) U.S. Cl.
CPC ........ *A22C 17/0086* (2013.01); *A22C 7/0023* (2013.01); *A22C 17/002* (2013.01);
(Continued)

(58) Field of Classification Search
CPC .... A22C 17/00; A22C 17/0086; A22C 17/002
(Continued)

(56) References Cited

U.S. PATENT DOCUMENTS 3,105,433 A  10/1963  Yerex et al.
3,179,039 A  4/1965  Christensen
(Continued)

FOREIGN PATENT DOCUMENTS

AU  200111314 A1  5/2001
AU  2012267912 B2  12/2012
(Continued)

OTHER PUBLICATIONS

Machine translation of DE 10220006 A1.
(Continued)

*Primary Examiner* — Richard T Price, Jr.
(74) *Attorney, Agent, or Firm* — Klintworth & Rozenblat IP LLP

(57) ABSTRACT

In an embodiment, an apparatus for processing meat product and a method of using same is provided. A first station includes a scanner which scans features of a meat product. A second station side straps the meat product in accordance with information received from the scan of the features. The second station includes a support, and spaced-apart knifes disposed on opposite sides of the support. Each knife has an axis of rotation that is normal to the longitudinal axis of the support. A position of each knife relative to the support in a direction normal to the longitudinal axis can be varied. A controller is programmed to control movement of each knife in accordance with the information received from the scanner.

35 Claims, 16 Drawing Sheets

(51) Int. Cl.
*A22C 17/02* (2006.01)
*A22C 7/00* (2006.01)

(52) U.S. Cl.
CPC .......... *A22C 17/0093* (2013.01); *A22C 17/02* (2013.01); *A22C 18/00* (2013.01)

(58) Field of Classification Search
USPC ................................ 452/149–152, 156, 157
See application file for complete search history.

(56) References Cited

U.S. PATENT DOCUMENTS

| | | | |
|---|---|---|---|
| 3,667,521 A | 6/1972 | Beasley | |
| 3,842,260 A | 10/1974 | Christensen et al. | |
| 3,846,958 A | 11/1974 | Divan | |
| 3,901,140 A | 8/1975 | Dohm, Jr. | |
| 3,982,299 A * | 9/1976 | Kompan | A22C 17/004 |
| | | | 452/157 |
| 3,990,336 A | 11/1976 | Soodalter | |
| 4,557,019 A * | 12/1985 | Van Devanter | A22C 25/18 |
| | | | 452/157 |
| 4,651,384 A | 3/1987 | Korhonen | |
| 4,962,568 A | 10/1990 | Rudy et al. | |
| 4,967,652 A | 11/1990 | Mally | |
| 5,064,667 A | 11/1991 | Mally | |
| 5,117,717 A | 6/1992 | Mally | |
| 5,267,168 A | 11/1993 | Antonissen et al. | |
| 5,314,375 A | 5/1994 | O'Brien et al. | |
| 5,324,228 A | 6/1994 | Vogeley, Jr. | |
| 5,334,084 A | 8/1994 | O'Brien et al. | |
| 5,429,548 A | 7/1995 | Long et al. | |
| 5,431,935 A | 7/1995 | Carey | |
| 5,470,274 A | 11/1995 | Kadi et al. | |
| 5,482,166 A | 6/1996 | Brown | |
| 5,668,634 A | 9/1997 | Newman | |
| 5,727,997 A * | 3/1998 | Dufour | A22B 5/0058 |
| | | | 452/152 |
| 5,944,598 A | 8/1999 | Tong et al. | |
| 6,129,625 A | 10/2000 | Cate et al. | |
| 6,186,059 B1 | 2/2001 | Mello et al. | |
| 6,189,059 B1 | 2/2001 | Sotek et al. | |
| 6,198,834 B1 | 3/2001 | Belk et al. | |
| 6,511,370 B1 | 1/2003 | Mello et al. | |
| 6,601,499 B1 | 8/2003 | Bifulco | |
| 6,604,991 B1 | 8/2003 | Jurs et al. | |
| 6,692,345 B1 | 2/2004 | Kruger | |
| 6,859,282 B1 | 2/2005 | Weber et al. | |
| 6,860,804 B2 | 3/2005 | Kruger | |
| 7,052,388 B2 | 5/2006 | Houtz | |
| 7,156,730 B1 | 1/2007 | Blaine | |
| 7,251,537 B1 | 7/2007 | Blaine et al. | |
| 7,364,504 B2 * | 4/2008 | Gasbarro | A22C 17/002 |
| | | | 452/155 |
| 7,373,217 B2 | 5/2008 | Young | |
| 7,399,220 B2 | 7/2008 | Kriesel et al. | |
| 7,450,247 B2 | 11/2008 | Sandberg et al. | |
| 7,452,266 B2 | 11/2008 | Bottemiller | |
| 7,500,550 B2 | 3/2009 | Strong et al. | |
| 7,621,806 B2 | 11/2009 | Bottemiller et al. | |
| 7,623,249 B2 | 11/2009 | Sandberg et al. | |
| 7,651,388 B2 | 1/2010 | Faires et al. | |
| 7,715,935 B2 | 5/2010 | Vogeley, Jr. et al. | |
| 7,747,042 B2 | 6/2010 | Blaine | |
| 7,841,264 B2 | 11/2010 | Kim et al. | |
| 7,918,718 B2 | 4/2011 | Christensen et al. | |
| 7,949,414 B2 | 5/2011 | Blaine et al. | |
| 8,016,649 B2 | 9/2011 | Schimitzek | |
| 8,025,000 B2 | 9/2011 | kim et al. | |
| 8,116,554 B2 | 2/2012 | Burton | |
| 8,166,856 B2 | 5/2012 | Kim et al. | |
| 8,373,749 B2 | 2/2013 | Burton | |
| 8,517,806 B2 | 8/2013 | Fillenworth et al. | |
| 8,529,321 B2 | 9/2013 | Weber | |
| 8,643,851 B2 | 2/2014 | Weber | |
| 8,688,267 B2 | 4/2014 | Blaine et al. | |
| 8,721,405 B2 | 5/2014 | McKenna et al. | |
| 8,758,099 B2 | 6/2014 | Reifenhaeuser | |
| 8,968,808 B1 | 3/2015 | Kunert et al. | |
| 8,986,080 B2 * | 3/2015 | Black | A22C 17/12 |
| | | | 452/150 |
| 9,091,673 B2 | 7/2015 | Fern et al. | |
| 9,095,147 B2 | 8/2015 | Hjalmarsson et al. | |
| 9,198,442 B2 | 12/2015 | Peters et al. | |
| 9,247,755 B1 | 2/2016 | Andre et al. | |
| 9,285,213 B2 | 3/2016 | Lindee et al. | |
| 9,351,498 B2 | 5/2016 | Grimm et al. | |
| 9,386,780 B2 | 7/2016 | Soncimi | |
| 9,526,257 B1 | 12/2016 | Farrant et al. | |
| 9,538,768 B2 | 1/2017 | Dunivan | |
| 9,700,060 B2 | 7/2017 | Inoue et al. | |
| 9,770,838 B2 | 9/2017 | Kim et al. | |
| 9,778,651 B2 | 10/2017 | Strong et al. | |
| 9,888,696 B2 | 2/2018 | Lindee et al. | |
| 9,913,483 B2 | 3/2018 | Vuholm et al. | |
| 10,040,213 B2 | 8/2018 | Nielsen | |
| 10,863,751 B2 | 12/2020 | Blaine | |
| 10,869,489 B2 | 12/2020 | Blaine et al. | |
| 2001/0036807 A1 | 11/2001 | Veldkamp et al. | |
| 2002/0004366 A1 | 1/2002 | Thorvaldsson et al. | |
| 2004/0029514 A1 | 2/2004 | Kruger | |
| 2004/0200365 A1 | 10/2004 | Young | |
| 2005/0032471 A1 * | 2/2005 | Pfarr | B23K 26/0838 |
| | | | 452/181 |
| 2005/0085176 A1 | 4/2005 | Houtz | |
| 2005/0199111 A1 | 9/2005 | Sandberg et al. | |
| 2006/0154587 A1 | 7/2006 | Mikkelsen et al. | |
| 2006/0156878 A1 | 7/2006 | Faires et al. | |
| 2006/0162515 A1 | 7/2006 | Vogeley, Jr. et al. | |
| 2006/0171581 A1 | 8/2006 | Blaine | |
| 2006/0205335 A1 | 9/2006 | Bifulco | |
| 2007/0202229 A1 | 8/2007 | Nielsen | |
| 2008/0200107 A1 | 8/2008 | Christensen et al. | |
| 2008/0212842 A1 | 9/2008 | Burton | |
| 2008/0281461 A1 | 11/2008 | Blaine et al. | |
| 2009/0035434 A1 | 2/2009 | Sverrisson et al. | |
| 2009/0038455 A1 | 2/2009 | Strong et al. | |
| 2009/0064833 A1 | 3/2009 | Sandberg et al. | |
| 2009/0137195 A1 | 5/2009 | Bottemiller et al. | |
| 2009/0246333 A1 | 10/2009 | Groneberg-Nienstedt et al. | |
| 2010/0066824 A1 | 3/2010 | Burton | |
| 2010/0179684 A1 | 7/2010 | Blaine et al. | |
| 2010/0267320 A1 | 10/2010 | Weber | |
| 2010/0304652 A1 * | 12/2010 | Bolte | A22C 17/0086 |
| | | | 452/157 |
| 2011/0111682 A1 | 5/2011 | Schimitzek | |
| 2011/0154969 A1 | 6/2011 | Weber | |
| 2012/0018353 A1 | 1/2012 | McKenna et al. | |
| 2012/0040597 A1 | 2/2012 | Fern et al. | |
| 2012/0115406 A1 | 5/2012 | Fillenworth et al. | |
| 2012/0212603 A1 | 8/2012 | Lindee et al. | |
| 2013/0260660 A1 | 10/2013 | Reifenhaeuser | |
| 2015/0093488 A1 | 4/2015 | Gutmann et al. | |
| 2015/0150272 A1 | 6/2015 | Peters et al. | |
| 2015/0205288 A1 | 7/2015 | Strong et al. | |
| 2015/0216192 A1 | 8/2015 | Jacobsen et al. | |
| 2016/0088852 A1 | 3/2016 | Lindee et al. | |
| 2017/0035066 A1 | 2/2017 | Hukelmann | |
| 2017/0156354 A1 | 6/2017 | Inoue et al. | |
| 2017/0210023 A1 | 7/2017 | Hocker et al. | |
| 2017/0212506 A1 | 7/2017 | Pfarr et al. | |
| 2017/0217044 A1 | 8/2017 | Blaine | |
| 2017/0245509 A1 | 8/2017 | Petersen et al. | |
| 2018/0027848 A1 | 2/2018 | Blaine et al. | |
| 2018/0029246 A1 | 2/2018 | Blaine et al. | |
| 2018/0158537 A1 | 6/2018 | Blaine | |
| 2019/0009421 A1 | 1/2019 | Grasselli | |
| 2020/0068908 A1 * | 3/2020 | Blaine | B26D 5/007 |
| 2020/0068909 A1 | 3/2020 | Blaine et al. | |

FOREIGN PATENT DOCUMENTS

| | | |
|---|---|---|
| AU | 2013202066 A1 | 10/2013 |
| AU | 2013301673 B2 | 2/2014 |
| CA | 2531857 A1 | 6/2006 |

(56) References Cited

FOREIGN PATENT DOCUMENTS

| | | |
|---|---|---|
| CA | 2550972 A1 | 12/2006 |
| CA | 2877448 C | 10/2016 |
| CA | 2904958 A1 | 3/2017 |
| CN | 105979784 A | 9/2016 |
| DE | 2843388 A1 | 6/1979 |
| DE | 8128596 U1 | 3/1982 |
| DE | 3100901 A1 | 8/1982 |
| DE | 68903375 T2 | 3/1993 |
| DE | 10220006 A1 | 11/2003 |
| DE | 102004010696 A1 | 9/2005 |
| DE | 60305523 T2 | 8/2007 |
| DE | 102010021951 A1 | 12/2011 |
| DE | 102012107278 A1 | 2/2014 |
| DE | 102019110313 B3 | 7/2020 |
| DK | 201570224 A1 | 4/2015 |
| EP | 0101264 A2 | 2/1984 |
| EP | 0057478 B1 | 4/1986 |
| EP | 0373844 A1 | 6/1990 |
| EP | 1174034 A1 | 1/2002 |
| EP | 1555882 B1 | 5/2006 |
| EP | 1289374 B1 | 7/2007 |
| EP | 1782929 A2 | 9/2007 |
| EP | 2084968 A1 | 5/2009 |
| EP | 1781110 B1 | 2/2010 |
| EP | 2210495 A1 | 7/2010 |
| EP | 2341313 A1 | 7/2011 |
| EP | 2353391 A1 | 8/2011 |
| EP | 2625959 A2 | 8/2013 |
| EP | 2531038 B1 | 12/2013 |
| EP | 2644337 B1 | 3/2014 |
| EP | 2755018 A1 | 7/2014 |
| EP | 3275313 A1 | 1/2018 |
| EP | 2882296 B1 | 4/2018 |
| EP | 3424332 A1 | 1/2019 |
| GB | 2075459 A | 11/1981 |
| GB | 2364894 A8 | 2/2002 |
| GB | 2377362 A | 1/2003 |
| JP | 2007522948 A | 8/2007 |
| JP | 5025271 B2 | 9/2012 |
| MX | 2017003541 A | 10/2017 |
| WO | 2004/106020 A1 | 12/2004 |
| WO | 2006080033 A1 | 8/2006 |
| WO | 2007/022782 A2 | 3/2007 |
| WO | 2007096363 A1 | 8/2007 |
| WO | 2012161577 A1 | 11/2012 |
| WO | 2013135264 A1 | 9/2013 |
| WO | 2013148322 A1 | 10/2013 |
| WO | 2014/023626 A2 | 2/2014 |
| WO | 2015/092935 A1 | 6/2015 |
| WO | 2015114118 A1 | 8/2015 |
| WO | 2015/193507 A1 | 12/2015 |
| WO | 2016/045683 A1 | 3/2016 |
| WO | 2018111108 A2 | 6/2018 |
| WO | 2020212246 A1 | 10/2020 |

OTHER PUBLICATIONS

Machine translation for DE2843388A1.
Machine translation for DE3100901A1.
Machine translation for DE8128596U1.
English Machine Translation of CN 105979784 A.
English Machine Translation of DE 102004010696 A1.
English Machine Translation of DE 102010021951 A1.
English Machine Translation of DE 102012107278 A1.
English Machine Translation of DE 60305523 T2.
English Machine Translation of EP 2341313 A1.
English Machine Translation of EP 3275313 A1.
English Machine Translation of JP 2007522948 A.
English Machine Translation of JP 5025271 B2.
English Machine Translation of MX 2017003541 A.
English machine translation of the abstract for DK 201570224 A1.
English Machine Translation of EP 2644337 B1.
English Machine Translation of WO 2015092935 A1.
International Search Report from International Patent Application No. PCT/US2020/027021 dated Jul. 8, 2020, 3 pages.
Written Opinion from International Patent Application No. PCT/US2020/027021 dated Jul. 8, 2020, 9 pages.

\* cited by examiner

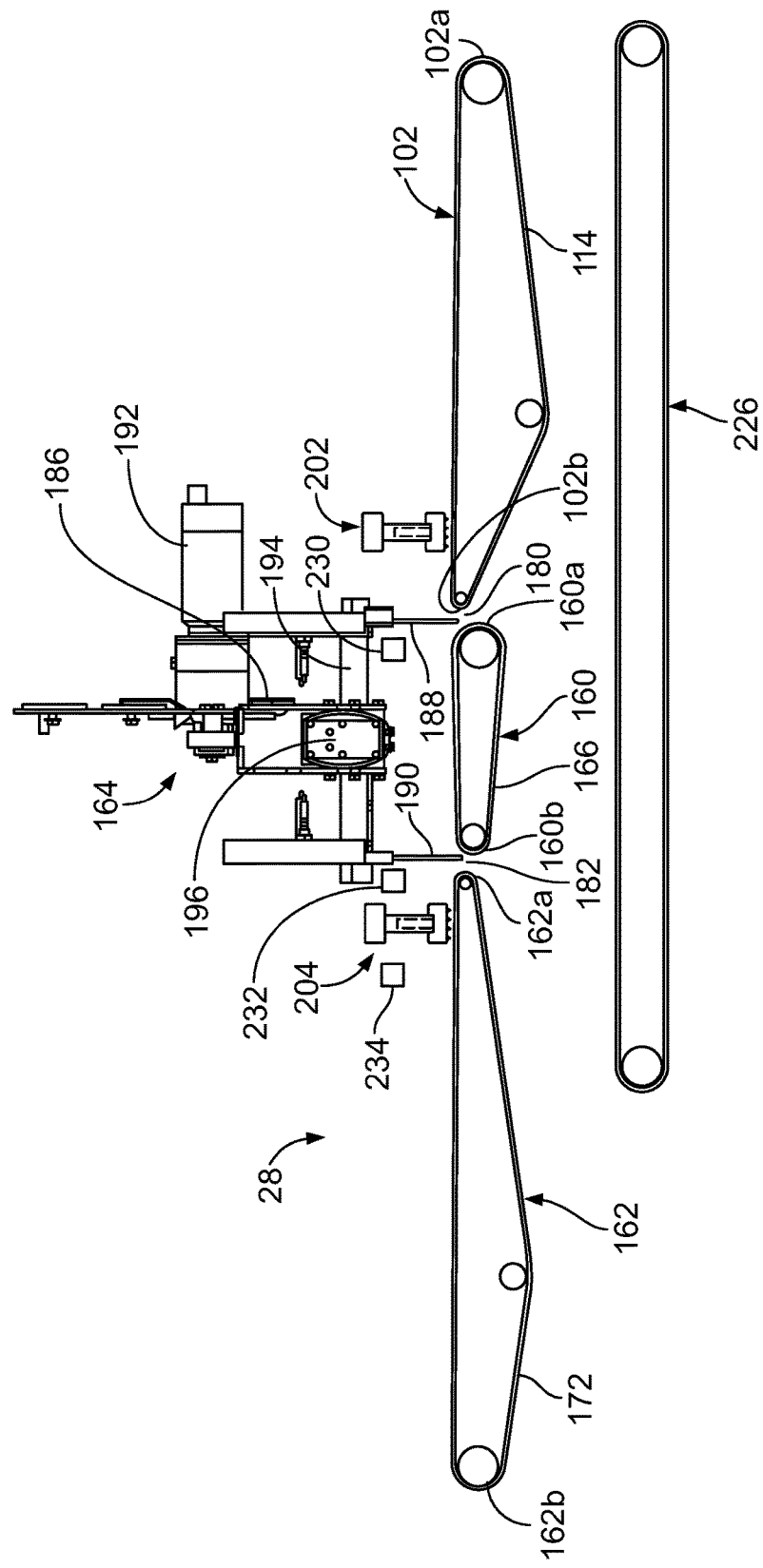
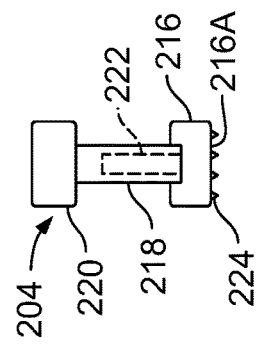
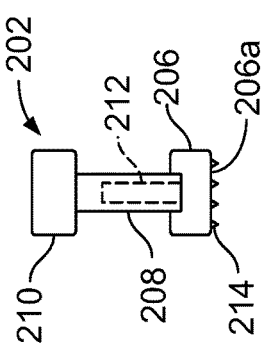
FIG. 11
FIG. 11A
FIG. 11B

APPARATUS AND METHOD FOR CUTTING MEAT PRODUCTS INTO BLOCKS OF MEAT

RELATED APPLICATIONS

The present application claims the priority benefit of U.S. Provisional Patent Application No. 62/830,820, filed Apr. 8, 2019, which is hereby incorporated by reference.

FIELD OF THE DISCLOSURE

The present disclosure generally relates to an apparatus and method for cutting meat products into blocks of meat.

BACKGROUND

Bacon bellies after decombing are often unshaped which is not ideal for form pressing and slicing. Bacon bellies that are too wide may be cracked in the form press. Wide or high regions of the bacon bellies may be overpressed and thin regions may wrinkle. All of this results in nonconforming slices exiting the slicer which cannot be used for consumption. As a result, the yield of the bacon belly is reduced. Additionally, unshaped parts produce scrap on the slicer, result in significant grading effort, and reduce throughput on the slicer.

Prior machines for side strapping bacon bellies typically cut to a fixed width of the bacon belly. This results in predefined, uniform side strapping. With prior machines, it is typically not possible to individually cut the left or right side with respect to the shape to optimize the bacon belly for maximum yield on the slicer. For example, a particular bacon belly cannot have thin parts cut away on one side, with less being cut on the other side. With prior machines, it is typically not possible to cut each belly to an individual size for the optimum individual width for form pressing corresponding to the shape, state and composition.

SUMMARY

In one aspect of the disclosure, an apparatus for processing meat product and a method of using same is provided. A first station includes a scanner which scans features of a meat product. A second station side straps the meat product in accordance with information received from the scan of the features. The second station includes a support, and spaced-apart knifes disposed on opposite sides of the support. Each knife has an axis of rotation that is normal to the longitudinal axis of the support. A position of each knife relative to the support in a direction normal to the longitudinal axis can be varied. A controller is programmed to control movement of each knife in accordance with the information received from the scanner.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 11 depicts a side elevation view of the third station;

FIG. 11A depicts an enlarged side elevation view of an upstream meat product engagement assembly of the third station;

FIG. 11B depicts an enlarged side elevation view of a downstream meat product engagement assembly of the third station;

DETAILED DESCRIPTION

Figure 1:
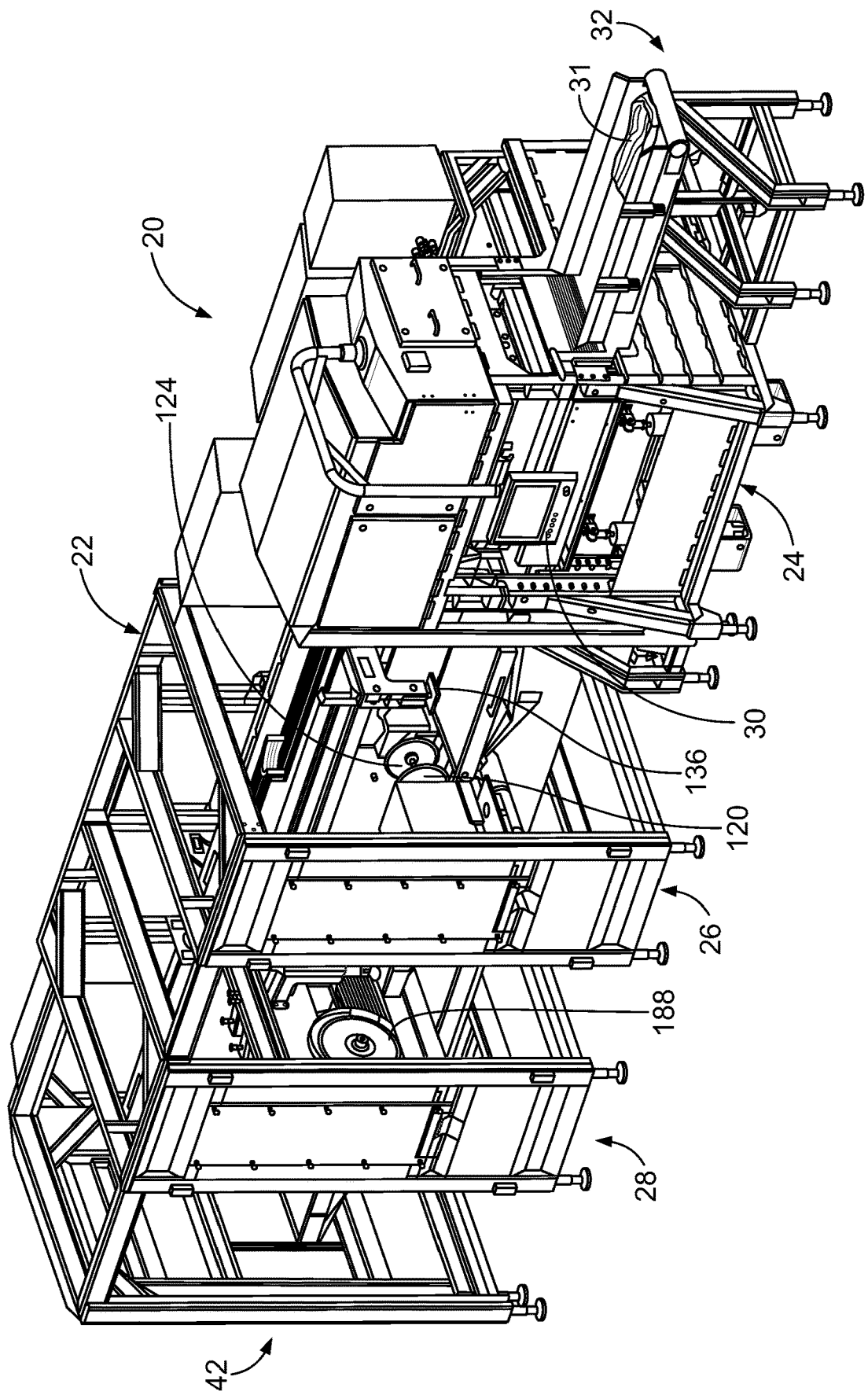
FIG. 1 depicts a top perspective view of one example of an apparatus for cutting meat product into blocks of meat, according to one aspect of the present disclosure.
Figure 2:
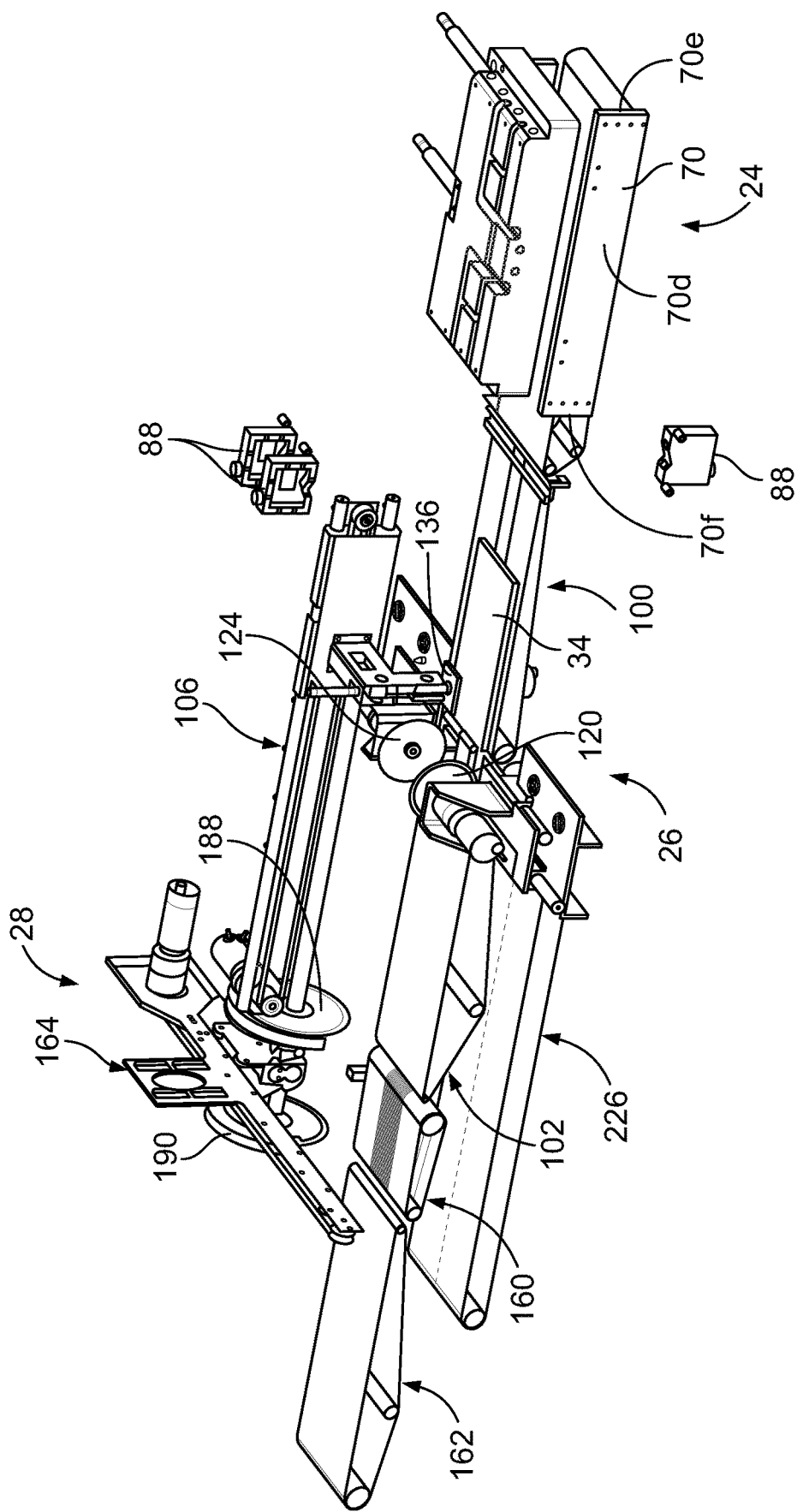
FIG. 2 depicts a top perspective view of the apparatus shown in FIG. 1 with the framework removed to expose the first, second and third internal stations of the apparatus.
Figure 3:
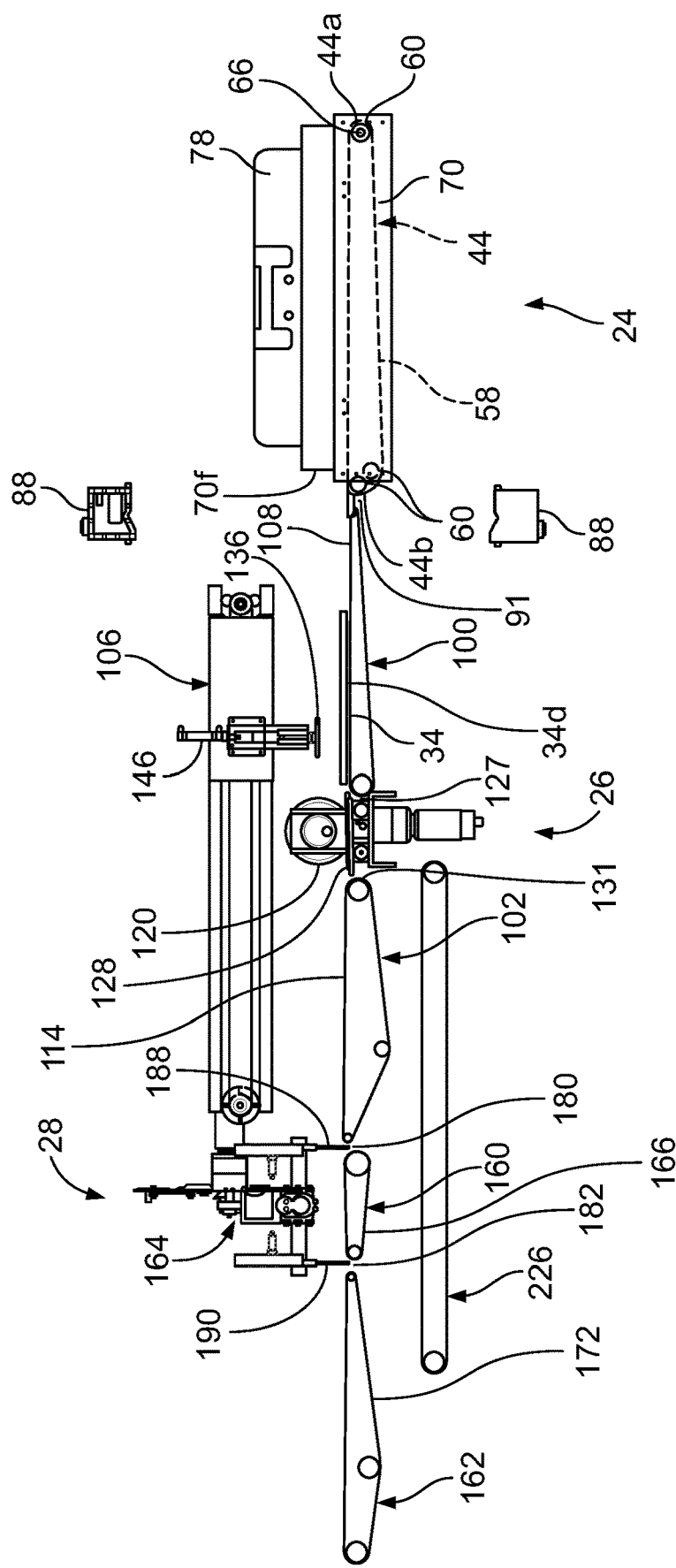
FIG. 3 depicts a side elevation view of the first, second and third internal stations of the apparatus.

FIGS. 1-3 shows one example of an apparatus 20 for cutting unshaped three-dimensional meat product 31 into a block of meat 40. The unshaped three-dimensional meat product 31 may be frozen. The unshaped three-dimensional meat product 31 may be pork bellies, however other meats or food may be processed by the apparatus 20.

The apparatus 20 is an in-line system which is compact in floor space. The apparatus 20 includes a framework 22 which supports a first station 24, a second station 26 downstream of the first station 24, a third station 28 downstream of the first station 24, and a controller 30 configured to control operation of the stations 24, 26, 28. While the second station 26 is shown and described herein as being directly downstream of the first station 24 and the third station 28 is directly downstream of the second station 26, it is to be understood that the third station 28 can instead be directly downstream after the first station 24 with the second station 26 being directly downstream of the third station 28. The stations 24, 26, 28 are in line with each other, that is, the axes as described herein, are aligned with each other.

The framework 22 is mounted on a horizontal ground surface and includes various mechanisms and power systems for powering the apparatus 20. The controller 30 includes all the necessary hardware and software to perform all of the operations and functions of the apparatus 20.

The first station 24 accepts unshaped three-dimensional meat product 31 in a first end 32 of the apparatus 20, flattens the unshaped three-dimensional meat product 31 in two dimensions to form a flattened meat product 35, and thereafter scans the flattened meat product 35 to form a scanned meat product 34. The unshaped three-dimensional meat product 31 may be generally in a rectangular or square shape when the unshaped three-dimensional meat product 31 is fed into the apparatus 20. The second station 26 receives the scanned meat product 34, see FIG. 6A, from the first station 24 and side straps the scanned meat product 34 to form a side strapped meat product 36 (i.e. cuts or trims sides of the scanned meat product 34 from the remaining portion of the meat product), see FIG. 6B. The third station 28 receives the side strapped meat product 36 from the second station 26 and first docks (i.e. cuts) a front end of the side strapped meat product 36 to form a front-end docked meat product 38, see FIG. 6C, and thereafter docks (i.e. cuts) a rear end of the front-end docked meat product 38 to form a block of meat 40 which exits a second end 42 of the apparatus 20, see FIG. 6D. The block of meat 40 is generally rectangular with parallel sides and parallel front and back ends. When the block of meat 40 exits the second end 42 of the apparatus 20, the block of meat 40 is ready for further processing such as form pressing into blocks, slicing into slices and/or packaging.

A slicer (not shown) is downstream of the apparatus 20 and is used to cut the block of meat 40 into slices. The yield of suitable slices and slicer throughput is increased with use of the apparatus 20. The apparatus 20 flattens the top and sides. The apparatus 20 smart cuts the four sides (i.e. front, back and both sides of the product); since the unshaped parts of the front and back of the meat product are cut, there is less scrap on the slicer, more slicer throughput and less grading effort required to form conforming slices; and since one or both of the sides are side strapped, wrinkles are prevented which result from thin regions at the sides and the fat side may be cut away to provide leaner slices. To maximize yield the apparatus 20 affects the following steps:

I. The meat product is flattened.

II. The meat product is 3d-scanned (data of surface shape).

III. The scanning data is processed. Defined features which the controller 30 uses to find the right cutting positions are recognized by software and the software calculates the ideal cuts to prepare the meat product to obtain maximum yield out of the individual product shape.

IV. The meat product is side strapped and docked according to the cutting decisions.

Figure 4:
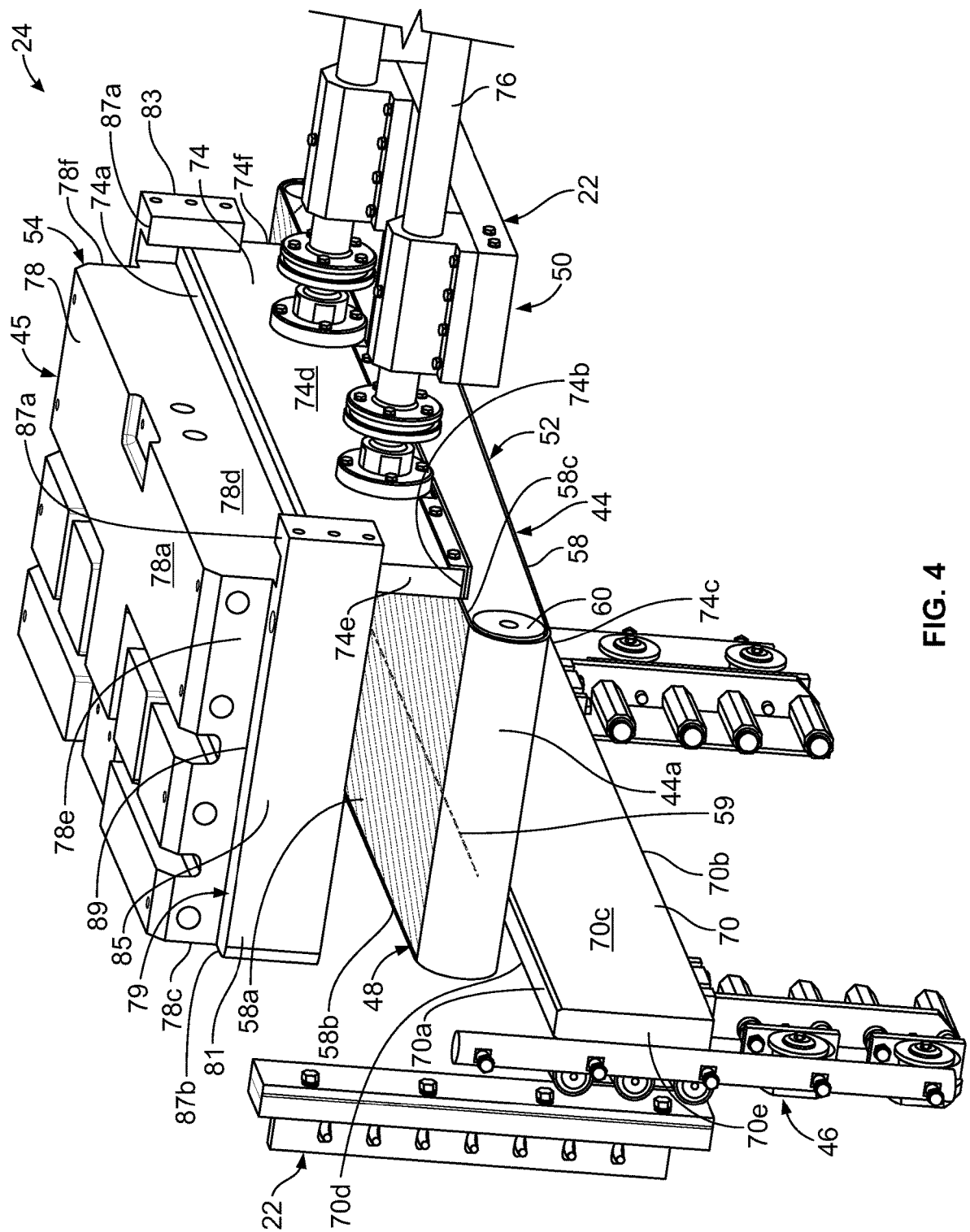
FIG. 4 depicts a top perspective view of a first station of the apparatus.

The first station 24 is best shown in FIG. 4. The first station 24 includes a conveyor 44, a flattener 45 which includes a height adjustable stop plate assembly 46 which is adjacent to a first side 48 of the conveyor 44, a width adjustable stamp assembly 50 which is adjacent to a second, opposite side 52 of the conveyor 44, and a height adjustable stamp assembly 54 which is adjacent to an upper surface 58a of the conveyor 44. The unshaped three-dimensional meat product 31 is flattened in two dimensions to in the first station 24 to form a flattened meat product 35. The unshaped three-dimensional meat product 31 is flattened to reduce the height so that the resulting flattened meat product 35 lays flat on the conveyor 44 and does not lose position (if the initial unshaped three-dimensional meat product 31 is curled, etc.), and the unshaped three-dimensional meat product 31 is flattened to reduce the width to provide for an appropriate orientation of the resulting flattened meat product 35 is on the conveyor 44 so that the resulting flattened meat product 35 can be cut into a generally rectangular shape.

The conveyor 44 includes an endless belt 58 which circulates around rollers 60 positioned at least at upstream and downstream ends 44a, 44b of the conveyor 44. The rollers 60 are rotatably attached to the framework 22. One of the rollers 60 is driven by a suitable driver 66, such as a drum motor, which is in communication with the controller 30 and actuation of the driver 66 is affected by the controller 30. The upper surface 58a of the belt 58 defines a planar surface upon which the unshaped three-dimensional meat product 31 is initially positioned for processing by the apparatus 20. A width of the belt 58 is defined between side edges 58b, 58c of the belt 58. A longitudinal axis 59 of the belt 58 is defined between the upstream and downstream ends 44a, 44b of the conveyor 44.

The height adjustable stop plate assembly 46 includes a plate 70 which can be moved vertically upwardly and downwardly by a suitable actuator 72, such as pneumatic cylinder or a spring, attached to the framework 22. The actuator 72 normally biases the plate 70 upwardly. The plate 70 is formed as a block having a planar surfaces 70a-70f. The planar inner side surface 70c faces the side edge 58b of the belt 58, is normal to the upper surface 58a of the belt 58, and is parallel to the axis 59 of the belt 58. The front upstream surface 70e is proximate to the upstream end 44a of the conveyor 44, and the rear downstream surface 70f is proximate to the downstream end 44b of the conveyor 44. The plate 70 can be moved vertically upwardly and downwardly to vary the vertical distance of the top surface 70a of the plate 70 from the upper surface 58a of the belt 58.

The width adjustable stamp assembly 50 includes a stamp 74 which can be moved horizontally inwardly and outwardly by a suitable driver 76, such as a motor driven spindle or an air activated piston rod, attached to the stamp 74 and mounted on the framework 22. The driver 76 is in communication with the controller 30 and actuation of the driver 76 is affected by the controller 30. The stamp 74 is formed as a block having a planar surfaces 74a-74f. The planar inner side surface 74c faces the planar inner side surface 70c of the plate 70 of the height adjustable stop plate assembly 46. The inner side surface 74c of the stamp 74 is normal to the upper surface 58a of the belt 58, is parallel to the axis 59 of the belt 58 and parallel to the inner side surface 70c. The front upstream surface 74e is proximate to the upstream end 44a of the conveyor 44, and the rear downstream surface 74f is proximate to the downstream end 44b of the conveyor 44. The stamp 74 can be moved horizontally inwardly and outwardly by the driver 76 to vary the distance the inner side surface 74c of the stamp 74 is from the side surface 70c of the plate 70 of the height adjustable stop plate assembly 46. The planar bottom surface 74b of the stamp 74 is adjacent to, and parallel to, the upper surface 58a of the belt 58. When the stamp 74 is moved horizontally toward or away from the plate 70, the bottom surface 74b of the stamp 74 passes over a portion of the upper surface 58a of the belt 58.

The height adjustable stamp assembly 54 includes a stamp 78 which can be moved vertically upwardly and downwardly by a suitable driver 80, such as a motor driven spindle or an air activated piston rod, attached to the framework 22. The driver 80 is in communication with the controller 30 and actuation of the driver 80 is affected by the controller 30. The stamp 78 and its driver 80 can be moved horizontally relative to the belt 58 and the framework 22 by the movement of the stamp 74 of the width adjustable stamp assembly 50 as described herein. The stamp 78 is slidably attached to the framework 22 so that the stamp 78 can be moved horizontally. The stamp 78 is formed as a block having planar surfaces 78a-78f. The planar bottom surface 78b faces, and is parallel to, the upper surface 58a of the belt 58. A portion of the bottom surface 78b overlaps the top surface 70a of the plate 70 of the height adjustable stop plate assembly 46. The planar side surface 78d faces the planar inner side surface 74c of the stamp 74 of the width adjustable stamp assembly 50 and is adjacent to an upper end of the inner side surface 74c. The front upstream surface 78e of the stamp 78 is proximate to the upstream end 44a of the conveyor 44, and the rear downstream surface 78f of the stamp 78 is proximate to the downstream end 44b of the conveyor 44. The stamp 78 has a width between opposite side surfaces 78c, 78d which is approximately the same as the width of the belt 58. The stamp 78 can be moved vertically upwardly and downwardly by the driver 80 to vary the distance the bottom surface 78b of the stamp 78 is from the upper surface 58a of the belt 58.

The stamp 78 is mounted in a connecting link 79 that is slidably attached to the framework 22. The connecting link 79 is slidable relative to the framework 22 in a direction normal to the longitudinal axis 59. The connecting link 79 includes a forward bracket member 81 slidably attached to the framework 22, and a rearward bracket member 83 slidably attached to the framework 22. Each bracket member 81, 83 is generally U-shaped having a base 85 extending in a direction normal to the longitudinal axis 59 and an arm 87a, 87b at each end of the base 85 such that a recess 89 is formed. The arms 87a, 87b on the forward bracket member 81 extend rearward and are parallel to the longitudinal axis 59. The arms 87a, 87b on the rearward bracket member 83 extend forward and are parallel to the longitudinal axis 59. The recess 89 has a width defined between the arms 87a, 87b which is greater than the width of the stamp 78. The stamp 78 seats within the recesses 89 in the bracket members 81, 83. An upper portion of the stamp 74 proximate to the top surface 74a seats within the recesses 89 proximate to the arms 87a to substantially fill the remainder of the recesses 89. The planar inner side surface 74c of the stamp 74 is proximate to and may engage against the planar side surface 78d of the stamp 78.

Figure 5A:
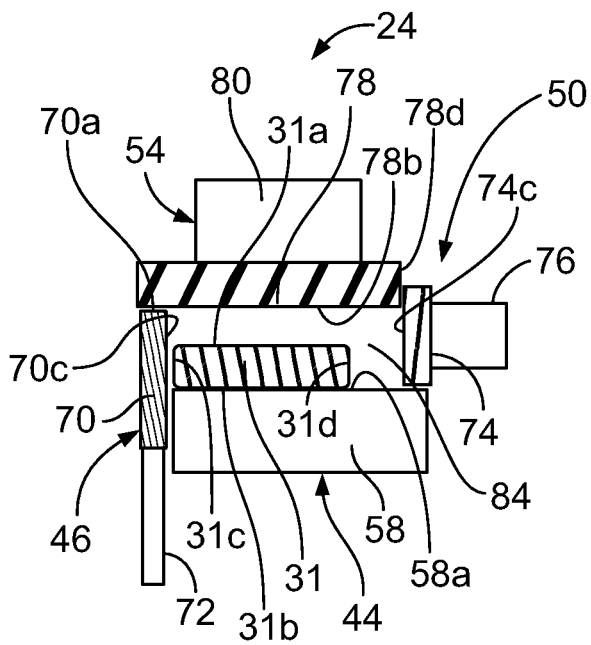
FIGS. 5A-5C depict schematic views showing various examples of steps in one example of an operation of the first station shown in FIG. 4.

FIG. 5A shows the first station 24 in a first position ready to accept the unshaped three-dimensional meat product 31 therein through the first end 32. The top surface 70a of the plate 70 of the height adjustable stop plate assembly 46 is spaced a predetermined distance above the upper surface 58a of the belt 58, the distance being greater than a top surface 31a of the unshaped three-dimensional meat product 31. The side surface 70c of the plate 70 of the height adjustable stop plate assembly 46 is adjacent to the side edge 58b of the belt 58, and the bottom surface 70b is below the upper surface 58a of the belt 58. The bottom surface 74b of the stamp 74 of the width adjustable stamp assembly 50 is above the upper surface 58a of the belt 58, and the top surface 74a is above the bottom surface 78b of the stamp 78 of the height adjustable stamp assembly 54. The outer side surface 74d of the stamp 74 of the width adjustable stamp assembly 50 aligns with the side edge 58c of the belt 58 and the inner side surface 74c of the stamp 74 abuts the side surface 78d of the stamp 78 of the height adjustable stamp assembly 54. As a result, a cavity 84 is formed between the upper surface 58a of the belt 58, the inner side surface 70c of the height adjustable stop plate assembly 46, the bottom surface 78b of the height adjustable stamp assembly 54, and the inner side surface 74c of the width adjustable stamp assembly 50 when the first station 24 is viewed looking from the upstream end 44a of the conveyor 44 toward the downstream end 44b of the conveyor 44.

The unshaped three-dimensional meat product 31 is placed onto the upper surface 58a of the belt 58 at the upstream end 44a and is moved into the cavity 84 by the movement of the belt 58. The unshaped three-dimensional meat product 31 may be placed onto the belt 58 such that a bottom surface 31b is on the upper surface 58a of the belt 58 and a side surface 31c of the unshaped three-dimensional meat product 31 is adjacent to the inner side surface 70c of the plate 70 of the height adjustable stop plate assembly 46. In this first position, the stamp 78 of the height adjustable stamp assembly 54 does not contact the top surface 31a of the unshaped three-dimensional meat product 31 and the stamp 74 of the width adjustable stamp assembly 50 does not contact the opposite side surface 31d of the unshaped three-dimensional meat product 31.

Figure 5B:
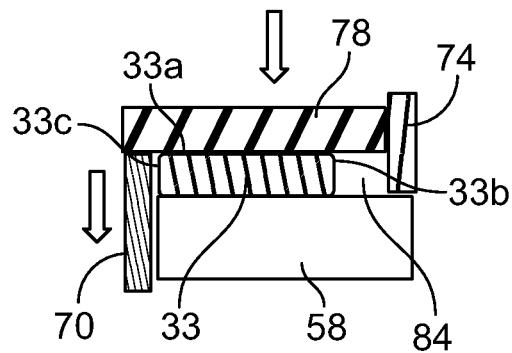

Thereafter, as shown in FIG. 5B, the driver 80 is activated by the controller 30 to vertically move the planar bottom surface 78b of the stamp 78 of the height adjustable stamp assembly 54 into contact with the top surface 31a of the unshaped three-dimensional meat product 31 and into a second position of the first station 24, thereby making the cavity 84 smaller, and flattening the meat product 31 between top and bottom surfaces 31a, 31b and forming a top flattened meat product 33 such that the top flattened meat product 33 has been flattened in a first dimension (i.e. from the top). The stamp 78 moves vertically within the recesses 89 and relative to the bracket members 81, 83 and the stamp 74. During this vertical movement of the stamp 78 of the height adjustable stamp assembly 54, the planar bottom surface 78b of the stamp 78 of the height adjustable stamp assembly 54 engages the top surface 70a of the plate 70 of the height adjustable stop plate assembly 46 and the plate 70 is moved vertically downwardly against the action of the actuator 72.

Figure 5C:
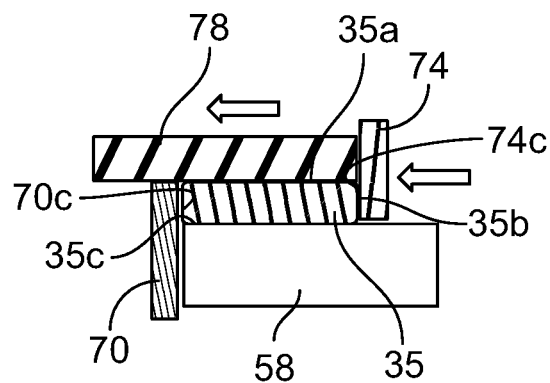

Thereafter, as shown in FIG. 5C, the driver 76 is activated by the controller 30 to move the planar inner side surface 74c of the stamp 74 of the width adjustable stamp assembly 50 in a horizontal direction and into contact with a side surface 33b of the top flattened meat product 33, and into a third position of the first station 24. In this third position, the cavity 84 is made even smaller, and the top flattened meat product 33 is flattened between the sides 33c, 33d thereof to form a flattened meat product 35. The planar inner side surface 74c of the stamp 74 of the width adjustable stamp assembly 50 and the planar inner side surface 70c of the plate 70 of the height adjustable stop plate assembly 46 engage against the sides of the top flattened meat product 33. If the top flattened meat product 33 is not originally against the planar inner side surface 70c of the plate 70 of the height adjustable stop plate assembly 46, when the stamp 74 of the width adjustable stamp assembly 50 is moved toward the plate 70, the top flattened meat product 33 is moved to be engaged against the inner side surface 70c of the height adjustable stop plate assembly 46. This further flattens the top flattened meat product 33 in a second dimension, thereby flattening in two dimensions (from the top and from the side). The flattened meat product 35 has a substantially planar top surface 35*a*, and side surfaces 35*b*, 35*c* which are substantially parallel to each other and are generally planar. The proper orientation of the flattened meat product 35 for further processing by the apparatus 20 is also set during the flattening with the width adjustable stamp assembly 50 since the flattened meat product 35 is engaged against the planar inner side surface 70*c* of the plate 70 of the height adjustable stop plate assembly 46. During this movement of the stamp 74 of the width adjustable stamp assembly 50, the inner side surface 74*c* of the stamp 74 of the width adjustable stamp assembly 50 presses on the side surface 78*d* of the stamp 78 of the height adjustable stamp assembly 54 which cause the stamp 78 and driver 80 of the height adjustable stamp assembly 54 to be moved horizontally.

When the driver 76 moves the stamp 74 of the width adjustable stamp assembly 50 in the horizontal direction, the stamp 78, its driver 80 and the bracket members 81, 83 are also moved.

Sufficient force is applied by the stamps 74, 78 to flatten the unshaped three-dimensional meat product 31 into the flattened meat product 35 having a general block shape. The unshaped three-dimensional meat product 31 is flattened with low forces in the two dimensions to form the flattened meat product 35. Top, bottom and side surfaces of the flattened meat product 35 will be substantially planar after the flattening, but will still have three-dimensional surfaces.

Since various unshaped three-dimensional meat products 31 will have different dimensions, it is necessary that the stamps 74, 78 can move independently of each other to any possible height and width.

After the flattened meat product 35 is formed, the driver 76 is activated by the controller 30 to move the stamp 74 of the width adjustable stamp assembly 50 away from the flattened meat product 35. When the driver 76 moves the stamp 74 of the width adjustable stamp assembly 50 in the reverse horizontal direction, the bracket members 81, 83, the stamp 74 and its driver 80 also move in the reverse horizontal direction which causes the stamp 78 of the height adjustable stamp assembly 54 to return to its position directly above the belt 58. Thereafter, the driver 80 is activated by the controller 30 to move the stamp 78 of the height adjustable stamp assembly 54 vertically and away from the flattened meat product 35 which allows the plate 70 of the height adjustable stop plate assembly 46 to move vertically upwardly and return to its first position under action of the actuator 72. The flattened meat product 35 remains in contact with the inner side surface 70*c* of the plate 70 of the height adjustable stop plate assembly 46.

The flattened meat product 35 is then moved out of the cavity 84 by the movement of the belt 58 under control of the controller 30.

Figure 6A:
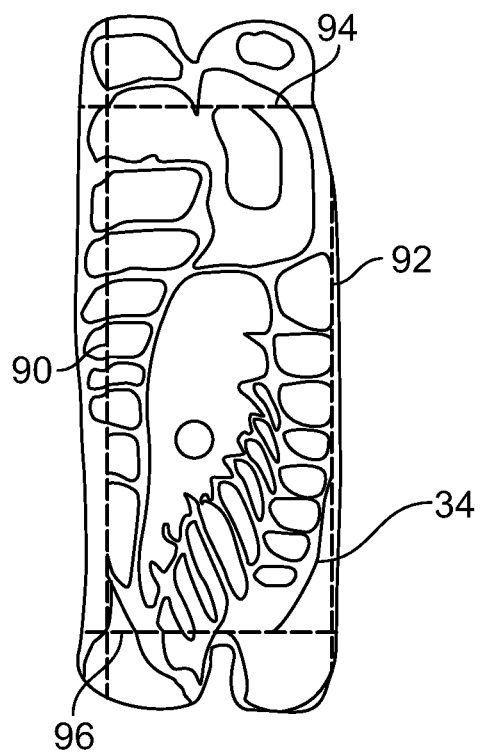
FIG. 6A depicts a top plan view of one example of a meat product which has been flattened in the first station of the apparatus, the meat product showing where examples of the imaginary cut lines would be placed after being scanned.
Figure 6B:
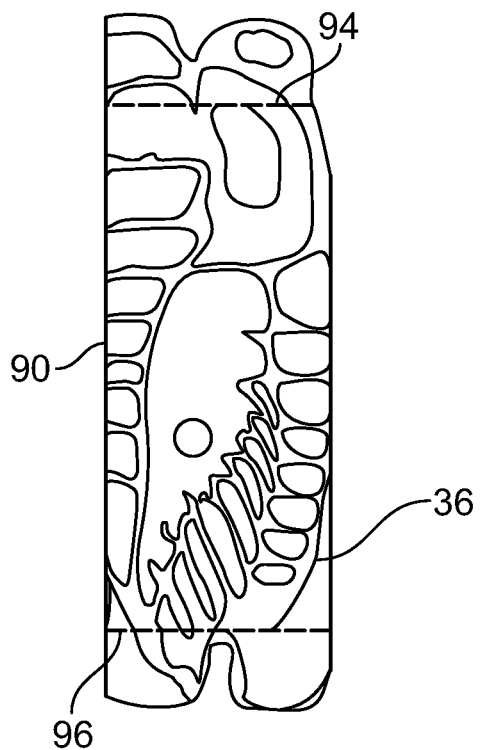
FIG. 6B depicts a top plan view of the meat product of FIG. 6A which has been side strapped in the second station of the apparatus, the meat product showing where examples of the imaginary front and back cut lines would be placed.
Figure 6C:
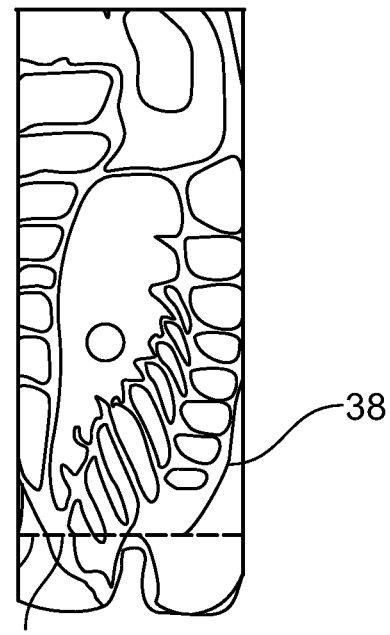
FIG. 6C depicts a top plan view of the meat product of FIG. 6B which has been docked at the front end thereof in the third station of the apparatus, the meat product showing where an example of the imaginary back cut line would be placed.

The first station 24 includes a scanner 88 at the downstream end 44*b* of the conveyor 44 that scans the flattened meat product 35 as the flattened meat product 35 exits off of the belt 58 and passes over a gap 91 between the belt 58 and the second station 26. Once the belt 58 moves to move the flattened meat product 35 out of the cavity 84, the next unshaped three-dimensional meat product 31 can be loaded onto the belt 58 for processing by the apparatus 20. The flattened meat product 35 is scanned by the scanner 88 and imaginary side cut lines 90, 92 and imaginary front and back cut lines 94, 96, see FIG. 6A, are determined by the controller 30 upon receiving information from the scanner 88 and to form a scanned meat product 34 as described herein.

The scanned meat product 34 is moved by the belt 58 under control of the controller 30 to the second station 26 where the scanned meat product 34 is side strapped as described herein.

Figure 7:
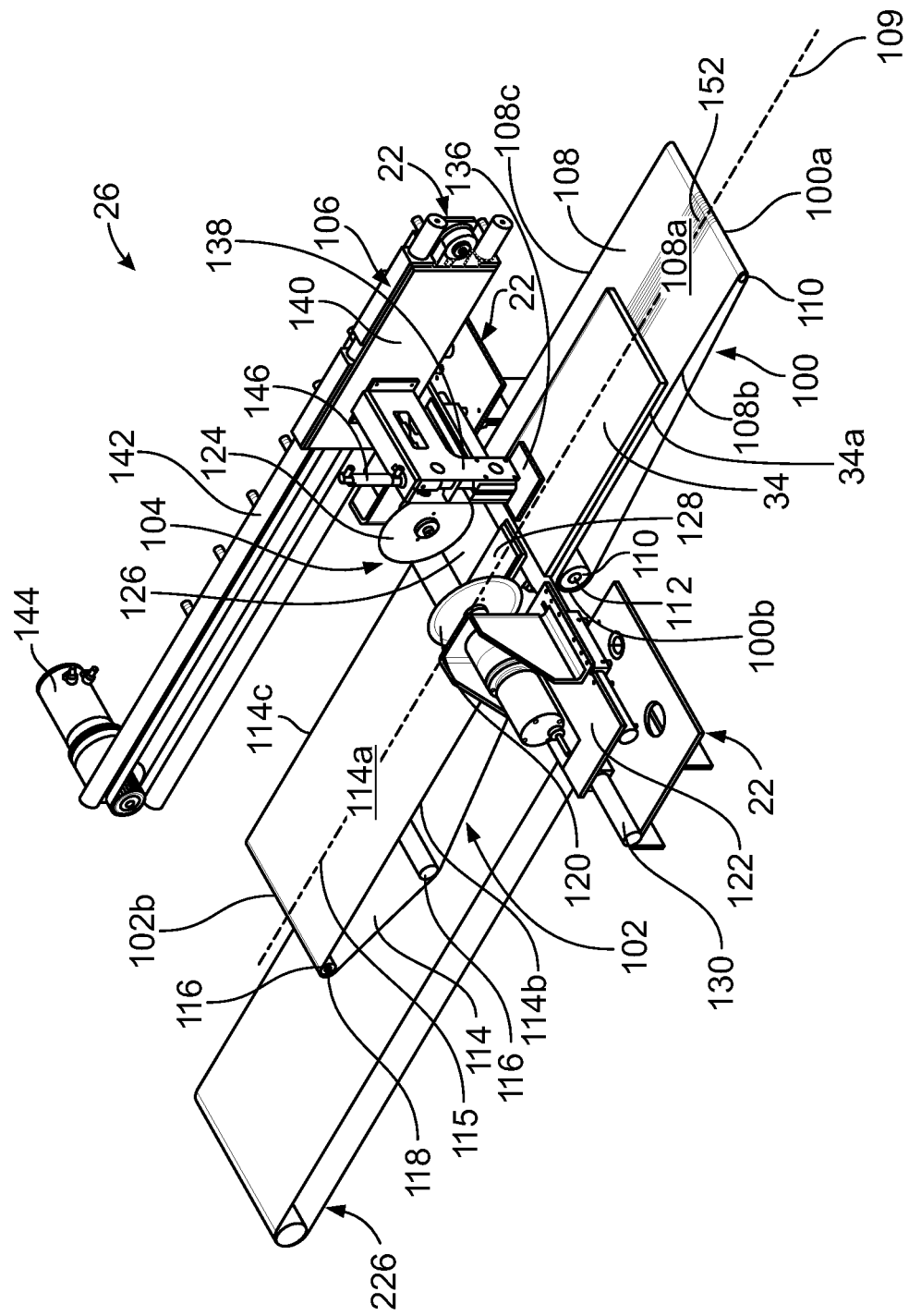
FIG. 7 depicts a top perspective view of the second station of the apparatus.
Figure 8:
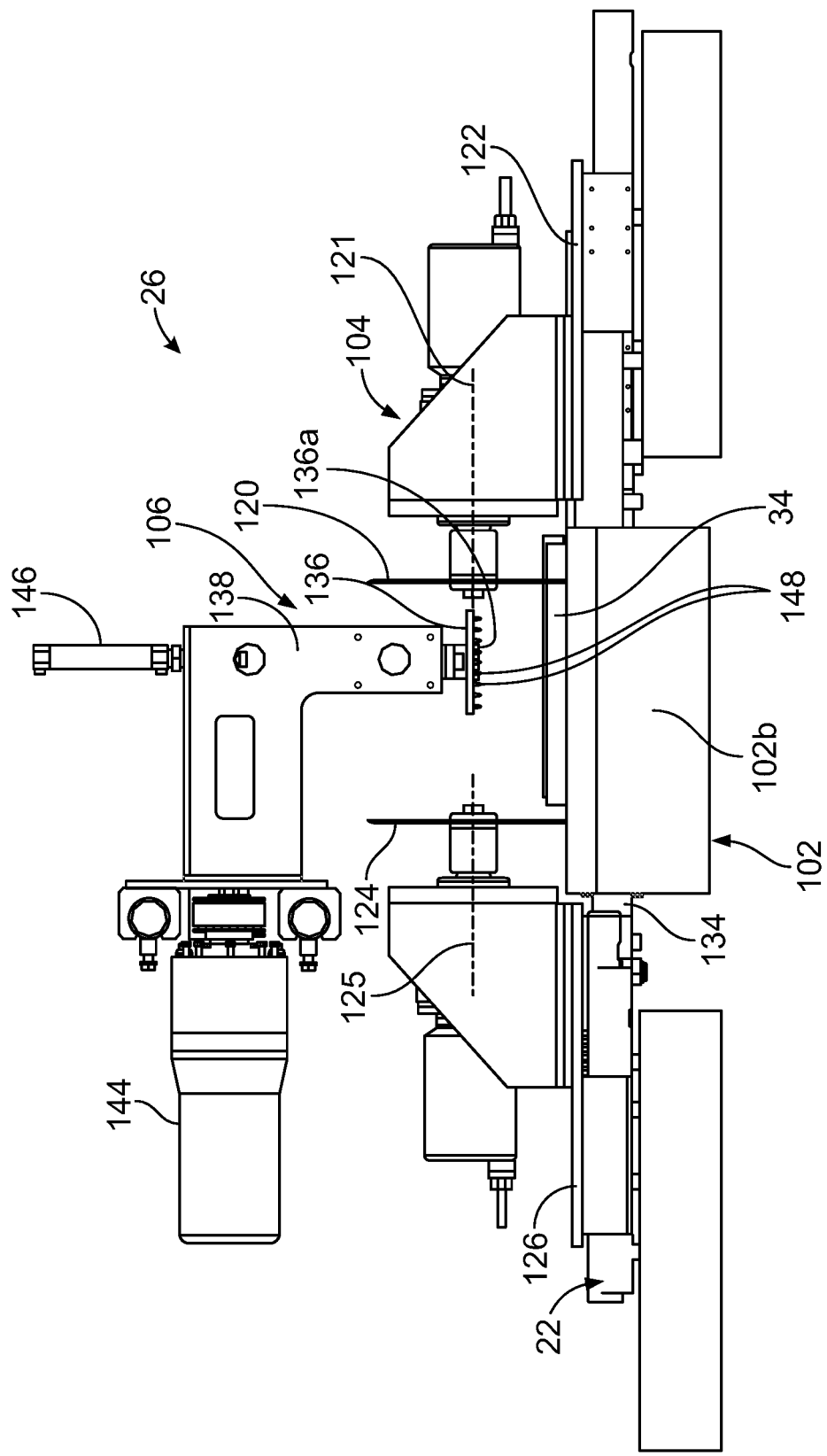
FIG. 8 depicts a front end elevation view of the second station.
Figure 9:
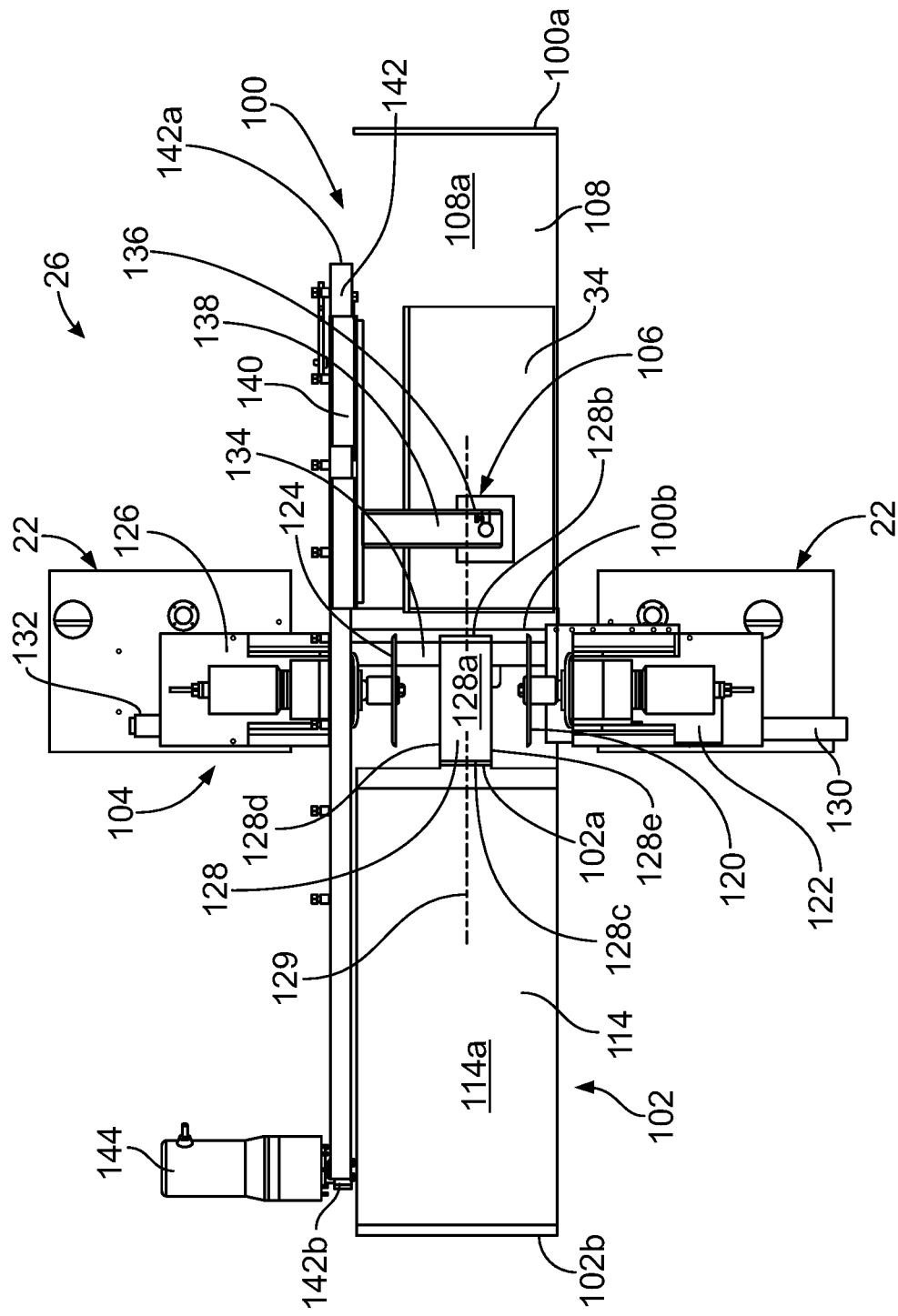
FIG. 9 depicts a top plan view of the second station.
Figure 10:
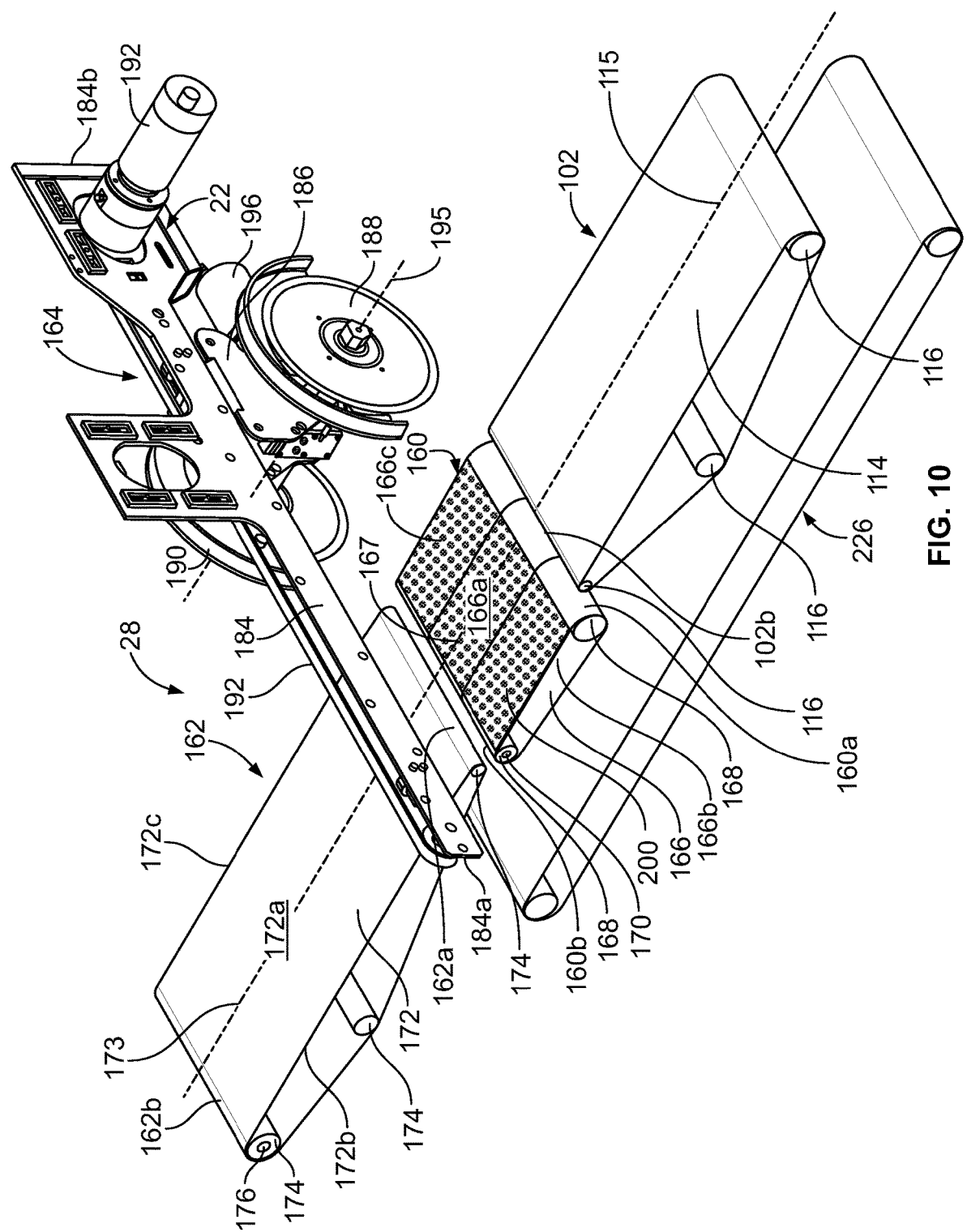
FIG. 10 depicts a top perspective view of a third station of the apparatus.
Figure 12:
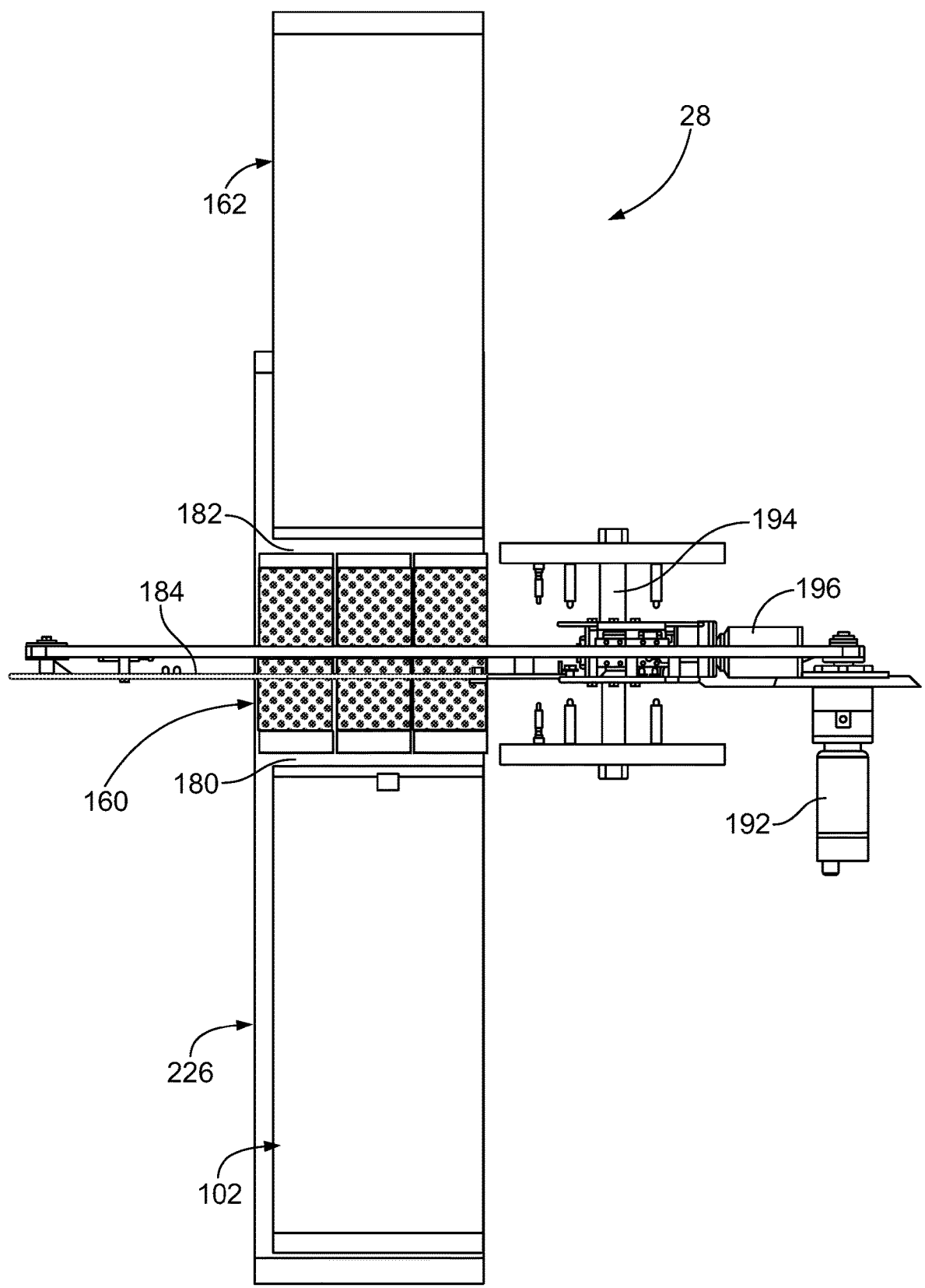
FIG. 12 depicts a top plan view of the third station.

The second station 26 is best shown in FIGS. 7-9. The second station 26 includes an upstream conveyor 100, a downstream conveyor 102, a blade assembly 104 between the conveyors 100, 102, and a meat product engagement assembly 106 mounted above the conveyors 100, 102. The upstream conveyor 100, the downstream conveyor 102 and the meat product engagement assembly 106 are used to move the scanned meat product 34 through the blade assembly 104.

The upstream conveyor 100 includes an endless belt 108 which circulates around rollers 110 positioned at least at upstream and downstream ends 100*a*, 100*b* of the upstream conveyor 100. The upstream end 100*a* is proximate to the gap 91. The rollers 110 are rotatably attached to the framework 22. One of the rollers 110 is driven by a suitable driver 112, such as a drum motor, which is in communication with the controller 30 and actuation of the driver 112 is affected by the controller 30. An upper surface 108*a* of the belt 108 defines a planar surface upon which the scanned meat product 34 is received from the downstream end 44*b* of the conveyor 44 of the first station 24 for further processing by the apparatus 20. A width of the belt 108 is defined between side edges 108*b*, 108*c* of the belt 108. A longitudinal axis 109 of the belt 108 is defined between the upstream and downstream ends 100*a*, 100*b* of the upstream conveyor 100.

The downstream conveyor 102 includes an endless belt 114 which circulates around rollers 116 positioned at least at upstream and downstream ends 102*a*, 102*b* of the downstream conveyor 102. The rollers 116 are rotatably attached to the framework 22. One of the rollers 116 is driven by a suitable driver 118, such as a drum motor, which is in communication with the controller 30 and actuation of the driver is affected by the controller 30. An upper surface 114*a* of the belt 114 defines a planar surface upon which the scanned meat product 34 is received from the end 44*b* of the conveyor 44 of the first station 24 for further processing by the apparatus 20. The upper surfaces 108*a*, 114*a* may be aligned with each other. A width of the belt 114 is defined between side edges 114*b*, 114*c* of the belt 114. The widths of the belts 108, 114 may be the same. A longitudinal axis 115 of the belt 114 is defined between the upstream and downstream ends 102*a*, 102*b* of the downstream conveyor 102. The longitudinal axes 109, 115 of the belts 108, 114 may be aligned with each other.

The blade assembly 104 includes a first circular knife 120 on a first mount 122 provided between the downstream end 100*b* of the upstream conveyor 100 and the upstream end 102*a* of the downstream conveyor 102, a second circular knife 124 on a second mount 126 provided between the downstream end 100*b* of the upstream conveyor 100 and the upstream end 102*a* of the downstream conveyor 102, and a support 128 mounted between the first and second circular knives 120, 124 and provided between the downstream end 100*b* of the upstream conveyor 100 and the upstream end 102*a* of the downstream conveyor 102.

The first circular knife 120 includes a motor and a blade driven by the motor. The blade of the first circular knife 120 is driven around an axis 121 which is normal to the longitudinal axes 109, 115 of the belts 108, 114 and the longitudinal axis 129 of the support 128. The blade of the first circular knife 120 may be a circular blade. The first mount 122 is attached to the framework 22 and can be moved relative to the framework 22 by a suitable driver 130, such as a motor driven spindle, to move the first circular knife 120 toward the support 128 or away from the support 128 in a direction is perpendicular to the support 128, while the blade of the first circular knife 120 remains parallel to the longitudinal axis 129 of the support 128. The driver 130 is in communication with the controller 30 and actuation of the driver 130 is affected by the controller 30.

The second circular knife 124 includes a motor and a blade driven by the motor. The blade of the second circular knife 124 is driven around an axis 125 which is normal to the longitudinal axes 109, 115 of the belts 108, 114 and the longitudinal axis 129 of the support 128. The blade of the second circular knife 124 may be a circular blade. The second mount 126 is attached to the framework 22 and can be moved relative to the framework 22 by a suitable driver 132, such as a motor driven spindle, to move the second circular knife 124 toward the support 128 or away from the support 128 in a direction is perpendicular to the support 128, while the blade of the second circular knife 124 remains parallel to the longitudinal axis 129 of the support 128. The driver 132 is in communication with the controller 30 and actuation of the driver 132 is affected by the controller 30.

The support 128 has a planar upper surface 128a, see FIG. 9, which extends between a front upstream end 128b and a rear downstream end 128c of the support 128. The upstream end 128b of the support 128 is proximate to, and slightly spaced from the downstream end 100b of the upstream conveyor 100 such that a gap 127 is formed therebetween. The downstream end 128c of the support 128 is proximate to, and slightly spaced from the upstream end 102a of the downstream conveyor 102 such that a gap 131 is formed therebetween. The support 128 defines a longitudinal axis 129 which extends between the upstream and downstream ends 128b, 128c. The longitudinal axis 129 of the support 128 may be aligned with the longitudinal axes 109, 115 of the upstream and downstream conveyors 100, 102 and with the longitudinal axis 59 of the conveyor 44. Side surfaces 128d, 128e extend between the upstream end 128b and the rear downstream end 128c such that a width of the support 128 is defined. The width of the support 128 is less than the widths of the belts 108, 114. The support 128 provides a surface on which the scanned meat product 34 is stably held during passage through the blade assembly 104 and may be, for example, a plate, guiding rods, a conveyor.

The upper surfaces 108a, 128a, 114a are generally aligned (e.g. substantially parallel) with each other, and may be generally aligned with the upper surface 58a of the belt 58 of the first station 24.

Each mount 122, 126 is mounted on the framework 22 and can be slid toward or away from the longitudinal axis 129 defined by the support 128 by the respective driver 130, 132 by the controller 30 acting upon information provided by the scanners 88 as to where the imaginary side cut lines 90, 92 are to be made. The mounts 122, 126 may be mounted on a common rail 134, see FIGS. 8 and 9, which extends under the support 128 and forms part of the framework 22.

The meat product engagement assembly 106 provides a mechanism for engaging the scanned meat product 34. The meat product engagement assembly 106 engages with the scanned meat product 34 as the scanned meat product 34 moves along the upstream conveyor 100, the downstream conveyor 102 and the support 128. The meat product engagement assembly 106 assists in maintaining proper alignment of the scanned meat product 34 through the second station 26.

In an embodiment, the meat product engagement assembly 106 includes at least one clamp 136 which extends from a housing 138 that is mounted on a frame 140 movably mounted on an elongated rail 142 of the framework 22 and an actuator 146, such as a pneumatic cylinder. The actuator 146 is in communication with the controller 30 and actuation of the actuator 146 is affected by the controller 30. The elongated rail 142 extends parallel to the longitudinal axes 109, 115, 129 of the conveyors 100, 102 and the support 128. The rail 142 has an upstream end 142a which is proximate to the upstream end 100a of the upstream conveyor 100, and has a downstream end 142b which is proximate to the downstream end 102b of the downstream conveyor 102. The frame 140 and the attached housing 138 and clamp 136 can be moved along the elongated rail 142 by actuation of a driver 144 mounted on the rail 142 from the upstream end 142a to the downstream end 142b. The driver 144 is in communication with the controller 30 and actuation of the driver 144 is affected by the controller 30. The housing 138 extends outwardly from the rail 142 and positions the clamp 136 over the longitudinal axes 109, 115, 129 of the conveyors 100, 102 and the support 128. The vertical position of the clamp 136 can be adjusted relative to the housing 138 and the rail 142 by the actuator 146 mounted on the housing 138 so that the clamp 136 engages a top surface of the scanned meat product 34. The clamp 136 has a lower surface 136a which faces the upper surfaces 108a, 114a, 128a of the belts 108, 114 and the support 128 when the clamp 136 is positioned over the belts 108, 114 and the support 128 as described herein. The lower surface 136a may have a plurality of gripping nubs 148 extending downwardly therefrom which are used to engage the top surface of the scanned meat product 34 as described herein.

In another embodiment, the meat product engagement assembly 106 is provided by a conveyor (not shown). In an embodiment, the conveyor is positioned over the upstream conveyor 100, the support 128 and the downstream conveyor 102. In an embodiment, the conveyor is positioned over the upstream conveyor 100 and the support 128. In an embodiment, the conveyor is positioned over the upstream conveyor 100. The conveyor extends along the longitudinal axes 109, 115, 129 of the conveyors 100, 102 and the support 128 (depending upon which component the conveyor extends over). In an embodiment, the conveyor is parallel to the upper surface of conveyors 100, 102 and the support 128 (depending upon which component the conveyor extends over) and can be raised or lowered under control the controller 30 to engage a top surface of the scanned meat product 34. In an embodiment, the conveyor can have an end that is tilted at an angle relative to the upper surface of the conveyors 100, 102 and the support 128 (depending upon which component the conveyor extends over) and the end can be biased upwardly upon contact with the meat product. The tilted conveyor may be biased downward by a passive component, such as a spring or a hydraulic actuator.

In another embodiment, the meat product engagement assembly 106 is provided by one or more wheels (not shown). In an embodiment, a single wheel is positioned over the upstream conveyor 100, the support 128 and the downstream conveyor 102. In an embodiment, a single wheel is positioned over the upstream conveyor 100 and a single wheel is positioned over the downstream conveyor 102. In an embodiment, a single wheel is positioned over the upstream conveyor 100, a single wheel is positioned over the support 128, and a single wheel is positioned over the downstream conveyor 102. The one or more wheels extend parallel to the longitudinal axes 109, 115, 129 of the conveyors 100, 102 and the support 128 (depending upon which component the wheel(s) extends over). In an embodiment, the wheel(s) can be raised or lowered under control the controller 30 to engage a top surface of the scanned meat product 34. In an embodiment, the wheel(s) can be biased upwardly upon contact with the meat product. The wheel(s) may be biased downward by a passive component, such as a spring or a hydraulic actuator.

In another embodiment, the meat product engagement assembly 106 is provided by a pusher (not shown) which is positioned over the upstream conveyor 100, the downstream conveyor 102 and the support 128, and can be raised or lowered under control the controller 30 to engage a rear or top surface of the scanned meat product 34. The pusher travels along a path which is parallel to the longitudinal axes 109, 115, 129 of the conveyors 100, 102 and the support 128, and passes between the blades of the knives 120, 124.

When the flattened meat product 35 reaches the downstream end 44b of the conveyor 44 of the first station 24, the flattened meat product 35 exits off of the conveyor 44 and onto the upstream end 100a of the upstream conveyor 100. As the flattened meat product 35 exits off of the conveyor 44, the flattened meat product 35 is scanned by the scanners 88 to form the scanned meat product 34.

In a first embodiment, the scanned meat product 34 is moved by the belt 108 under control of the controller 30 until a front end of the scanned meat product 34 is at, or proximate to, the downstream end 100b of the upstream conveyor 100. At this position, the belt 108 is stopped. The clamp 136 is then moved downward such that the lower surface 136a engages the upper surface of the scanned meat product 34 to clamp the scanned meat product 34 between the clamp 136 and the upper surface 108a of the belt 108. The surface of the belt 108 may have a gripping surface 152 thereon which grips a bottom surface 34d of the scanned meat product 34 to assist in maintaining the proper orientation of the scanned meat product 34 as it moves along the belt 108.

In a second embodiment, the clamp 136 is moved downward such that the lower surface 136a engages the upper surface of the scanned meat product 34 to clamp the scanned meat product 34 between the clamp 136 and the upper surface 108a of the belt 108. Thereafter, the scanned meat product 34 is moved by the belt 108 and the clamp 136 under control of the controller 30 until a front end of the scanned meat product 34 is at, or proximate to, the downstream end 100b of the upstream conveyor 100. At this position, the belt 108 is stopped. The surface of the belt 108 may have a gripping surface 152 thereon which grips a bottom surface 34d of the scanned meat product 34 to assist in maintaining the proper orientation of the scanned meat product 34 as it moves along the belt 108.

Information from the scanners 88 regarding where the cuts at the imaginary side cut lines 90, 92 are to be made is conveyed to the blade assembly 104 by the controller 30 and the mounts 122, 126 are moved to move each circular knife 120, 124 to its desired position where the cuts at the particular imaginary side cut lines 90, 92 are to be made. Each circular knife 120, 124 is independently movable by its driver 130, 132 under control of the controller 30 to position each circular knife 120, 124 into a desired position at where the imaginary side cut lines 90, 92 are to be made. Therefore, for each scanned meat product 34 that passes through the second station 26, the cuts at the imaginary side cut lines 90, 92 made by the blade assembly 104 can be particularly tailored to desired imaginary side cut lines 90, 92 determined by the controller 30. This provides a significant advantage over prior systems wherein the position of the circular knives was fixed relative to the longitudinal axis and the same side cuts were made on all meat products passing therethrough.

Thereafter, the clamped scanned meat product 34 is moved by the meat product engagement assembly 106 and the upstream conveyor 100 under control of the controller 30 toward the blade assembly 104 and onto the upper surface 128a of the support 128. When the clamped scanned meat product 34 engages with the blade assembly 104, the cuts at the imaginary side cut lines 90, 92 are made by the circular knives 120, 124. As shown, the cuts at the imaginary side cut lines 90, 92 are made simultaneously. The clamped scanned meat product 34 passes over the support 128 and is clamped between the clamp 136 and the upper surface 128a of the support 128 as the scanned meat product 34 is cut by the blades of the circular knives 120, 124 to form the side strapped meat product 36, see FIG. 6B. The clamping action of the clamp 136 maintains the proper orientation of the scanned meat product 34 as it passes through the blade assembly 104. The blades of the circular knives 120, 124 cut linearly extending side edges into the scanned meat product 34 such that the side edges are parallel to each other. During the cutting with the blades of the circular knives 120, 124, the clamp 136 passes between the blades of the circular knives 120, 124. The upper surface 128a of the support 128 has a slipping surface (not shown), so that the clamp 136 moves the scanned meat product 34 over the support 128 with little resistance. The length of the support 128 between the front upstream end 128b and the rear downstream end 128c is less than the shortest scanned meat product 34 such that the conveyors 100, 102 always support movement of the scanned meat product 34 by the clamp 136, before or after the support 128.

As the scanned meat product 34 is cut by the blade assembly 104 to form the side strapped meat product 36, the side strapped meat product 36 moves onto the downstream conveyor 102 as it passes out of the blade assembly 104. When the side strapped meat product 36 is partially on the support 128 and partially on the belt 114 of the downstream conveyor 102, the proper orientation of the side strapped meat product 36 is maintained since the side strapped meat product 36 is still gripped by the clamp 136 and held between the clamp 136 and the upper surface 128a of the support 128, and also held between the clamp 136 and the upper surface 114a of the downstream conveyor 102. The surface 114a of the belt 114 may have a gripping surface (not shown), such as gripping surface 152, thereon which grips a bottom surface of the side strapped meat product 36 to assist in maintaining the proper orientation of the side strapped meat product 36 as it passes between the blades of the circular knives 120, 124.

When the side strapped meat product 36 reaches the downstream end 102b of the downstream conveyor 102, the side strapped meat product 36 is moved into the third station 28 as described herein for further processing. Once the clamp 136 reaches the downstream end 142b of the rail 142, the clamp 136 is raised under control of the controller 30 to release its grip on the side strapped meat product 36 and so that the side strapped meat product 36 can move into the third station 28. In an embodiment, the clamp 136 does not engage the forwardmost end of the side strapped meat product 36 such that the forwardmost end of the side strapped meat product 36 enters into the third station 28 while still gripped by the clamp 136.

In an embodiment, after the clamp 136 is raised, the clamp 136 is moved to be at the upstream of the blade assembly 104 under control of the controller 30 so that the clamp 136 can be engaged with the next scanned meat product 34 exiting the first station 24.

After side strapping, the side strapped meat product 36 is conveyed by the belt 114 under control of the controller 30 of the downstream conveyor 102 into the third station 28 where the side strapped meat product 36 is docked to form the generally rectangular block of meat 40 is with parallel sides and parallel front and back ends.

While the scanned meat product 34 is described as being side strapped on both sides, the scanned meat product 34 may only be side strapped on one side if the information from the scanners 88 indicate that only a single side cut line needs to be made (for example as a result of the flattening, only one of the sides needs to be cut). Alternatively, if the width of the scanned meat product 34 is small enough for further processing, the scanned meat product 34 may not be side strapped at all. If the scanned meat product 34 is not to be side strapped, the blade assembly 104 is moved out of the way so that the scanned meat product 34 can pass into the third station 28.

The third station 28 is best shown in FIGS. 10-13. The third station 28 includes an upstream conveyor 160, a downstream conveyor 162, a blade assembly 164, an upstream meat product engagement assembly 202, and a downstream meat product engagement assembly 204. The meat product engagement assemblies 202, 204 are not shown in FIG. 3 or FIG. 10.

The upstream conveyor 160 includes an endless belt 166 which circulates around rollers 168 positioned at least at upstream and downstream ends 160a, 160b of the upstream conveyor 160. The rollers 168 are rotatably attached to the framework 22. One of the rollers 168 is driven by a suitable driver 170, such as a drum motor, which is in communication with the controller 30 and actuation of the driver 170 is affected by the controller 30. An upper surface 166a of the belt 166 defines a planar surface upon which the side strapped meat product 36 is received from the downstream end 102b of the second station 26 for further processing by the apparatus 20. A width of the belt 166 is defined between side edges 166b, 166c of the belt 166. A longitudinal axis 167 of the belt 166 is defined between upstream and downstream ends 160a, 160b of the upstream conveyor 160.

The downstream conveyor 162 includes an endless belt 172 which circulates around rollers 174 positioned at least at upstream and downstream ends 162a, 162b of the downstream conveyor 162. The rollers 174 are rotatably attached to the framework 22. One of the rollers 174 is driven by a suitable driver 176, such as a drum motor, which is in communication with the controller 30 and actuation of the driver 176 is affected by the controller 30. An upper surface 172a of the belt 172 defines a planar surface upon which the side strapped meat product 36 is received from the downstream 102b of the second station 26 for further processing by the apparatus 20. A width of the belt 172 is defined between side edges 172b, 172c of the belt 172. The widths of the belts 166, 172 may be the same. A longitudinal axis 173 of the belt 172 is defined between upstream and downstream ends 162a, 162b of the downstream conveyor 162. The longitudinal axes 167, 173 of the belts 166, 172 may be aligned with each other, and may be aligned with the other axes 59, 109, 115, 129.

The upper surfaces 166a, 172a may be generally aligned with each other, and may be generally aligned with the upper surfaces 58a, 108a, 114a of the first and second stations 24, 26.

The upstream end 160a of the upstream conveyor 160 is proximate to, and slightly spaced from the downstream end 102b of the downstream conveyor 102 of the second station 26 such that an upstream gap 180 is provided therebetween. The downstream end 160b of the upstream conveyor 160 is proximate to, and slightly spaced from the upstream end 162a of the downstream conveyor 162 such that a downstream gap 182 is provided therebetween.

The blade assembly 164 includes an elongated bar 184 of the framework 22 which extends normal to the longitudinal axes 167, 173 of the upstream and downstream conveyors 160, 162, a mount 186 movably mounted on the bar 184, an upstream circular knife 188 rotatably mounted on the mount 186, and a downstream circular knife 190 rotatably mounted on the mount 186.

The bar 184 has a first end 184a which is proximate to, and spaced outwardly from the side 166b of the upstream conveyor 160, and a second end 184b which is proximate to, and spaced outwardly from the side 166c of the upstream conveyor 160. The mount 186 and attached circular knives 188, 190 can be moved in a horizontal direction along the elongated bar 184 by actuation of a driver 192 mounted on the bar 184 between the ends 184a, 184b. The driver 192 is in communication with the controller 30 and actuation of the driver 192 is affected by the controller 30.

Each circular knife 188, 190 includes a blade. The blades of the circular knives 188, 190 may be parallel to each other and are mounted on a common axle 194 attached to the mount 186. The common axle 194 is driven by a common motor. The direction of rotation of the blades of the knives 188, 190 is normal to the longitudinal axes 167, 173. The axle 194 is rotated by a suitable driver 196, such as a motor, mounted on the mount 186. The driver 196 is in communication with the controller 30 and actuation of the driver 196 is affected by the controller 30. The axle 194 defines an axis 195 of rotation of the blades of the circular knives 188, 190 which is parallel to the axis 167 of the belt 166. The blade of the upstream circular knife 188 aligns with the upstream gap 180; the blade of the downstream circular knife 190 aligns with the downstream gap 182. When not in use, the circular knives 188, 190 are positioned on one side of the belt 166. The mount 186 is moved relative to the belt 166 by the driver 192 to move the circular knives 188, 190 through the gaps 180, 182.

The upstream meat product engagement assembly 202 includes at least one clamp 206 which extends from a housing 208 that is mounted on an elongated rail 210 of the framework 22 and an actuator 212, such as a pneumatic cylinder, mounted in the housing 208. The actuator 212 is in communication with the controller 30 and actuation of the actuator 212 is affected by the controller 30. The clamp 206 is positioned over the downstream end 102b of the downstream conveyor 102. The elongated rail 210 extends normal to the longitudinal axis 115 of the downstream conveyor 102. The vertical position of the clamp 206 can be adjusted relative to the housing 208 and the rail 210 by the actuator 212, such as a pneumatic cylinder, mounted on the housing 208, and thus relative to the belt 114. The clamp 206 has a lower surface 206a which faces the upper surfaces 114a of the belt 114. The lower surface 206a may have a plurality of gripping nubs 214 extending downwardly therefrom which are used to engage the side strapped meat product 36 as described herein.

The downstream meat product engagement assembly 204 includes at least one clamp 216 which extends from a housing 218 that is mounted on an elongated rail 220 of the framework 22 and an actuator 222, such as a pneumatic cylinder, mounted in the housing 218. The actuator 222 is in communication with the controller 30 and actuation of the actuator 222 is affected by the controller 30. The clamp 216 is positioned over the upstream end 162*a* of the downstream conveyor 162. The elongated rail 220 extends normal to the longitudinal axis 173 of the downstream conveyor 162. The vertical position of the clamp 216 can be adjusted relative to the housing 218 and the rail 220 by the actuator 222, such as a pneumatic cylinder, mounted on the housing 218, and thus relative to the belt 172. The clamp 216 has a lower surface 216*a* which faces the upper surfaces 114*a* of the belt 172. The lower surface 216*a* may have a plurality of gripping nubs 224 extending downwardly therefrom which are used to engage the side strapped meat product 36 as described herein.

In use, when the side strapped meat product 36 reaches the downstream end 102*b* of the conveyor 102 of the second station 26 by movement of the belt 114 under control of the controller 30, the side strapped meat product 36 exits off of the downstream conveyor 102, and onto the upstream end 160*a* of the upstream conveyor 160 of the third station 28. The belt 166 of the upstream conveyor 160 of the third station 28 and the belt 114 of the downstream conveyor 102 of the second station 26 are stopped under control of the controller 30 when the imaginary front cut line 94 of the side strapped meat product 36 overlaps the upstream gap 180.

In an embodiment, since the speeds of the belts 114, 166 are known, the belts 114, 166 are run until the controller 30 determines that the imaginary front cut line 94 of the side strapped meat product 36 overlaps the upstream gap 180.

In an embodiment, a sensor 230 is provided on the framework 22 and is communication with the controller 30. The sensor 230 senses properties of the side strapped meat product 36 and communicates the properties to the controller 30. The controller 30 then determines when the imaginary front cut line 94 of the side strapped meat product 36 overlaps the upstream gap 180. As an example, the scanners 88 that determine where the imaginary front cut line 94 is to be located provides information to the controller 30 as to how far the imaginary front cut line 94 is located from a front end of the scanned meat product 34. When the sensor 230 senses a front end of the side strapped meat product 36 and communicates this to the controller 30, the controller 30 runs the belts 114, 166 until the imaginary front cut line 94 of the side strapped meat product 36 overlaps the upstream gap 180.

The actuator 212 of the upstream meat product engagement assembly 202 is activated by the controller 30 to engage the clamp 206 with the side strapped meat product 36 positioned thereunder. Thereafter, the circular knives 188, 190 are activated by the controller 30 and are moved through the gaps 180, 182 so that the front end of the side strapped meat product 36 is docked at the imaginary front cut line 94 and forms a front-end docked meat product 38, see FIG. 6C.

Thereafter, the actuator 212 of the upstream meat product engagement assembly 202 is activated by the controller 30 to disengage the clamp 206 from the front-end docked meat product 38.

Thereafter, the front-end docked meat product 38 is moved onto the downstream conveyor 162 by movement of the belt 166 of the upstream conveyor 160 under control by the controller 30. The upstream conveyor 160 and the downstream conveyor 162 are stopped when the imaginary back cut line 96 of the front-end docked meat product 38 overlaps the downstream gap 182. The actuator 222 of the downstream meat product engagement assembly 204 is activated by the controller 30 to engage the clamp 216 with the front-end docked meat product 38 positioned thereunder.

In an embodiment, since the speeds of the belts 114, 166, 172 are known, the belts 114, 166, 172 are run until the controller 30 determines that the imaginary back cut line 96 of the front-end docked meat product 38 overlaps the downstream gap 182.

In an embodiment, a sensor 232 is provided on the framework 22 and is communication with the controller 30. The sensor 232 senses properties of the front-end docked meat product 38 and communicates the properties to the controller 30. The controller 30 then determines when the imaginary back cut line 96 of the front-end docked meat product 38 overlaps the downstream gap 182. As an example, the scanners 88 that determine where the imaginary back cut line 96 is to be located provides information to the controller 30 as to how far the imaginary back cut line 96 is from the imaginary front cut line 94. When the sensor 232 senses a front end of the front-end docked meat product 38 and communicates this to the controller 30, the controller 30 runs the belts 114, 166, 172 until the imaginary back cut line 96 of the front-end docked meat product 38 overlaps the downstream gap 182.

At the same time, the next unshaped three-dimensional meat product 31 is being processed by the apparatus 20 so as to form the next side strapped meat product 36. The next side strapped meat product 36 is processed as described herein until the imaginary front cut line 94 of the next side strapped meat product 36 overlaps the upstream gap 180 as described with regard to the first side strapped meat product 36. At this point, the conveyors 102, 160, 162 are stopped and the imaginary back cut line 96 of the front-end docked meat product 38 aligns with the downstream gap 182 and the imaginary front cut line 94 of the next side strapped meat product 36 aligns with the upstream gap 180.

The actuator 212 of the upstream meat product engagement assembly 202 is activated by the controller 30 to engage the clamp 206 with the next side strapped meat product 36 positioned thereunder. The actuator 222 of the downstream meat product engagement assembly 204 is activated by the controller 30 to engage the clamp 216 with the front-end docked meat product 38 positioned thereunder.

Figure 6D:
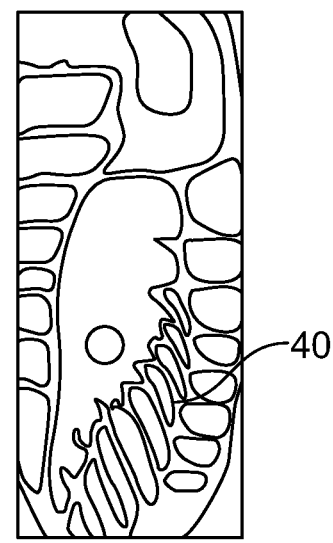
FIG. 6D depicts a top plan view of the meat product of FIG. 6C which has been docked at the rear end thereof in the third station of the apparatus.

Next, the circular knives 188, 190 are activated and are moved through the gaps 180, 182 so that the rear end of the front-end docked meat product 38 is cut along the imaginary back cut line 96 to form the block of meat 40, see FIG. 6D, and the next side strapped meat product 36 is cut along the imaginary front cut line 94 of that particular side strapped meat product 36 to form the next front-end docked meat product 38. The rear end of the front-end docked meat product 38 and the front end of the next side strapped meat product 36 are cut simultaneously. Because of the orientation of the meat products on the conveyors 102, 160, 162, the front and rear ends of each meat product are parallel to each other and a generally rectangular shape is formed.

Thereafter, the actuator 212 of the upstream meat product engagement assembly 202 is activated by the controller 30 to disengage the clamp 206 from the next front-end docked meat product 38, and the actuator 222 of the downstream meat product engagement assembly 204 is activated by the controller 30 to disengage the clamp 216 from the block of meat 40.

After the block of meat 40 is formed, the downstream conveyor 162 is activated by the controller 30 to move the block of meat 40 out of the apparatus 20 for further processing, such as slicing into slices and packaging. At the same time, the conveyors 102, 160 are activated to move the next front-end docked meat product 38 onto the downstream conveyor 162 to form the next block of meat 40. This process is continued for subsequent unshaped three-dimensional meat products 31 to be processed by the apparatus 20.

The belts 114, 166, 172 may have a gripping surface (shown for example at 200 on belt 166) provided thereon which grips a bottom surface of the side strapped meat product 36 to assist in maintaining the proper orientation of the side strapped meat product 36 as the ends thereof are docked.

A lower trim conveyor 226 may be provided below the upstream conveyor 160 and below the gap 131 between the support 128 and the downstream conveyor 102. The cut portions of the side strapped meat product 36, called trim, are received by the lower trim conveyor 226.

Figure 13:
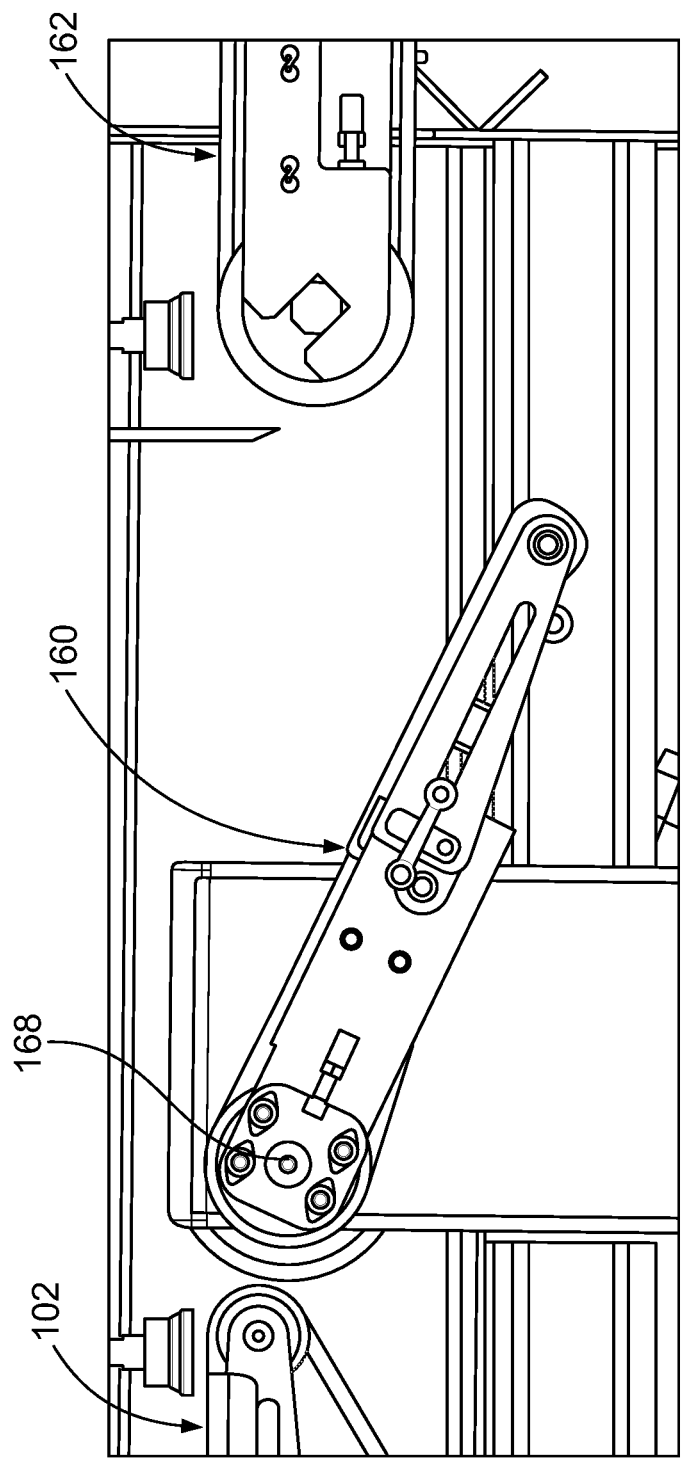
FIG. 13 depicts a partial side elevation view of the third station.

The lower trim conveyor 226 is further positioned underneath the upstream conveyor 160. In an embodiment, the upstream conveyor 160 pivots downwardly around the upstream roller 168 as shown in FIG. 13 so that the upstream conveyor 160 is at an angle relative to the horizontal. This deposits the trim from the cutting by the blade assembly 164 onto the lower trim conveyor 226. Thereafter, the upstream conveyor 160 is pivoted around the upstream roller 168 back to the horizontal position to receive the next side strapped meat product 36 for processing. Alternatively, the upstream conveyor 160 is lowered to align with the lower trim conveyor 226 and the upstream conveyor 160 is run to move the trim onto lower trim conveyor 226, and then the upstream conveyor 160 is thereafter raised. The lower trim conveyor 226 then conveys the trim away for further processing and/or disposal.

Since the lower trim conveyor 226 captures the trim, the slicer (not shown) which is used to form slices from the block of meat 40 has less trim on the slicer. In accordance with a usual procedure, the block of meat 40 is usually form pressed by a form press (not shown) in a cooling room before being sliced by the slicer.

Since the meat product is continually conveyed through the apparatus 20 by the conveyors 44, 100, 102, 160, 162, the orientation of the meat product as it is processed by the apparatus 20 is maintained.

As mentioned above, the first station 24 includes a scanner 88 at the downstream end 44b of the conveyor 44, which scans the flattened meat product 35 as the flattened meat product 35 exits the conveyor belt 58.

The scanner 88 preferably includes four scanning modules 88a, 88b, 88c, 88d, but any suitable number of scanning modules may be used. In a preferred embodiment, two scanning modules may be located above the meat product 35 proximal the gap 91, while two scanning modules may be located below the meat product 35, which scan the meat product 35 from underneath and through the gap 91, as the meat product 35 passes over the gap 91.

In another embodiment, three scanning modules may be located above the meat product 35 proximal the gap 91, while a fourth scanning module may be located below the meat product 35 and scans the meat product 35 from underneath and through the gap 91 as the meat product 35 passes over the gap 91. Any suitable configuration of scanning modules may be used depending upon the specific application, throughput speed, and scanning resolution needed, so long as the three-dimensional surface of the meat product 35 is scanned and evaluated.

Preferably, the scanning modules 88a, 88b, 88c, 88d are optical scanners (laser or LED output). However, other types of emitters/receivers may be used, such as ultrasonic or x-ray type components. The scanning modules 88a, 88b, 88c, 88d may emit an optical beam, which is reflected by the surface of the meat product 35. The reflected light is captured by a camera or receiver/sensor in the scanning module 88a, 88b, 88c, 88d, and represents a scan line. Many such lines of reflected contour information are received with a resolution of about 1 millimeter along the length of the flattened meat product 35, as set forth above, and the sum of all of the captured scan lines permits three-dimensional evaluation of the flattened meat product 35 by "stitching" together all of the scan lines during a software or hardware process. Based on the three-dimensional evaluation, the volume along the length of the flattened meat product 35 may be determined, along with other parameters, described below.

In one embodiment, each scanning module 88a, 88b, 88c, 88d is a self-contained integrated optical transmitter and receiver assembly. Preferably, each scanning module 88a, 88b, 88c, 88d uses a laser emitter as the optical light source. In other embodiments, the optical transmitter may be disposed in a physically separate structure from the optical receiver or sensor. The two components need not be integrated into a single module. Using the scanning modules 88a, 88b, 88c, 88d, the outside contour of the flattened meat product 35 or three-dimensional shape is obtained as the flattened meat product 35 moves along the conveyor belt 58 and through the gap 91.

Scanning may be performed with a resolution of about one millimeter along the entire length of the flattened meat product 35. Based on the scan of the contour, various features of the flattened meat product 35 can be determined, such as density of a particular 1 millimeter section, which determination may be optional (note that "section" may also be referred to as a "slice" although not actually cut from the flattened meat product 35), weight of the slice or section, muscle/fat boundaries, fat/lean distribution, identification of specific muscle boundaries, undesirable thin parts of the flattened meat product 35, thickness distribution of each one millimeter "slice," primary lean/secondary lean boundary or quantity, and the like. Note that determination of certain of the above-mentioned features, such as muscle/fat boundaries and fat/lean distribution in particular, may require the addition of an x-ray scanning device (not shown).

Note that although the flattened meat product 35 is first flattened by the first station 24, the flattened meat product 35 is not compressed under such high pressures as to completely lose its contour features. In other words, the flattened meat product 35 is not compressed into a solid featureless block, but rather, a low-pressure compression is performed by the first station 24 prior to scanning.

Based on some of the above-mentioned determined features, and using a rule-based decision process executed by the controller 30, the position of the side strapping blades and the docking blades are controlled by the controller 30 to perform their respective cuts so as to maximize or optimize yield and minimize waste.

Also note that the controller 30 may utilize machine learning techniques and feedback to improve the yield and minimize waste by adjusting the cutting parameters of the knives 120, 124 of the blade assembly 104 which affect the side strapping blades in the second station 26. In a preferred embodiment, the knives 188, 190 of the blade assembly 164 of the third station 28, which perform front and rear docking, are not controlled as to the spacing therebetween. Feedback may be based on information obtained after side-strapping and/or docking is performed, and such information may be obtained from a post-cut scanning module 234 mounted on the framework 22 that captures information or pictures of the cut surface of the block of meat 40 to determine fat/lean distribution or other of the above-mentioned determined features. The post-cut scanning module 234 is in addition to and separate from the scanning modules 88*a*, 88*b*, 88*c*, 88*d*. The post-cut scanning module 234 may be a camera.

Based on the determined features derived from the data from post-cut scanning module 234, the controller 30 may make a decision, for example, that either too much of the block of meat 40 was sliced away during side-strapping and/or docking, and thus the controller 30 may adjust the cutting parameters of the cutting operation with respect to the side strapping operation and/or the docking operation.

Figure 14:
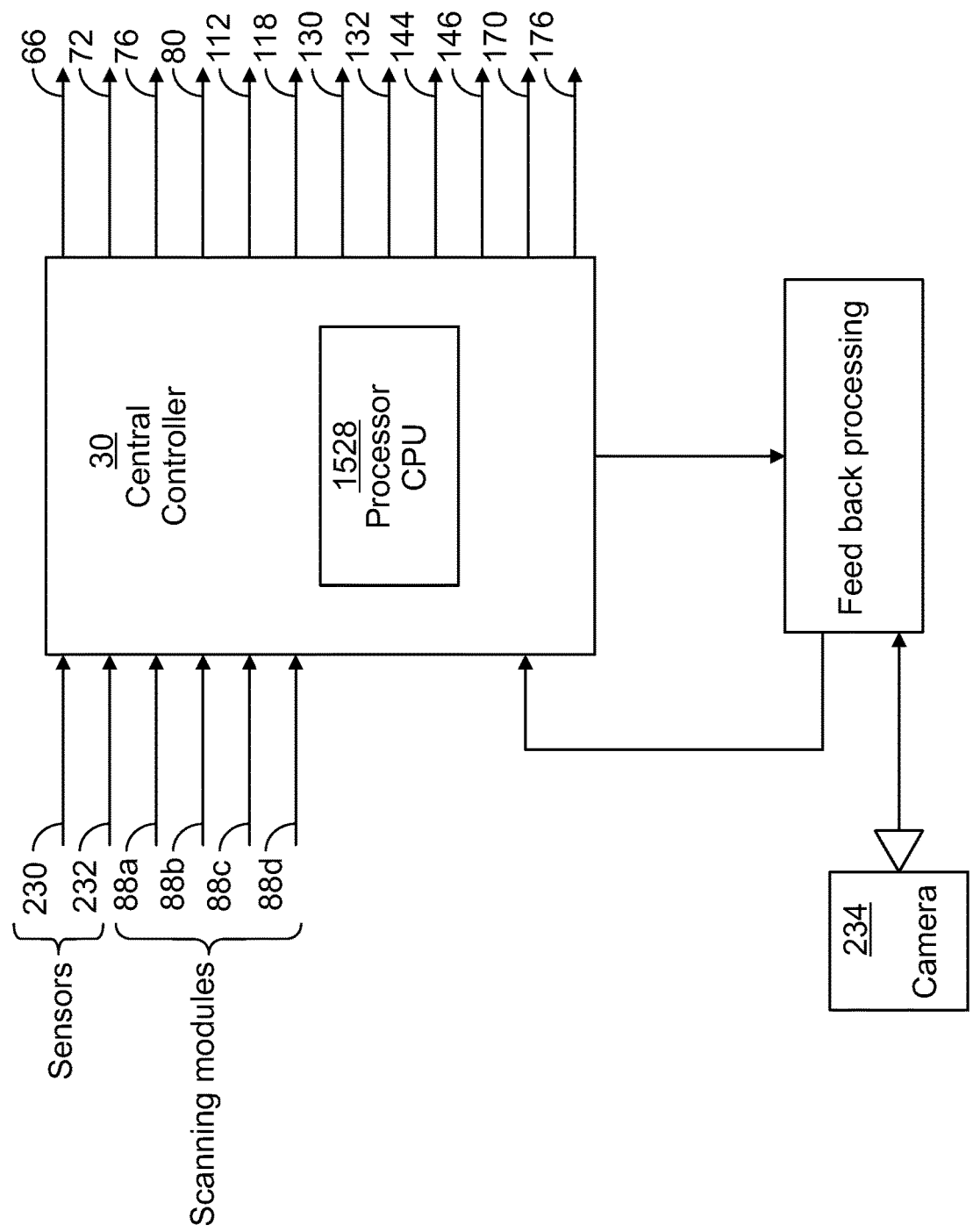
FIG. 14 depicts a block diagram.

As shown in FIG. 14, the controller 30, may include a central control unit or CPU 1528, which may receive input from the various sensors, including sensors 230, 232, and the multiple scanning modules 88*a*, 88*b*, 88*c*, 88*d*.

The controller 30 also provides output to drive various actuators, rollers, and motors, including driver 66 that drives the roller 60 of endless belt 58 of the conveyor 44, actuator 72 that adjusts the vertical height of the plate 70, driver 76 that drives the width adjustable stamp assembly 50, driver 80 that drives the vertically height adjustable stamp assembly 54, drum motor driver 112 that drives the rollers 110 of endless belt 108, driver 118 that drives the rollers 116 of endless belt 114, motor spindle driver 130 of first circular knife 120, motor spindle driver 132 of second circular knife 124, driver 144 that actuates upstream clamp 136, actuator 146 that moves the clamp 136, driver 170 that drives the roller 168 of the endless belt 166 of the upstream conveyor 160, driver 176 that drive rollers 174 of the endless belt 172 of the downstream conveyor 162, driver 192 that drives the circular knives 188, 190 horizontally along elongated bar 184, driver 196 that drives the axle 194 of the circular knives 188, 190, actuator 212 of the upstream meat product engagement assembly 202, the actuator 222 of the downstream meat product engagement assembly 204, and other various drivers and actuators.

Figure 15:
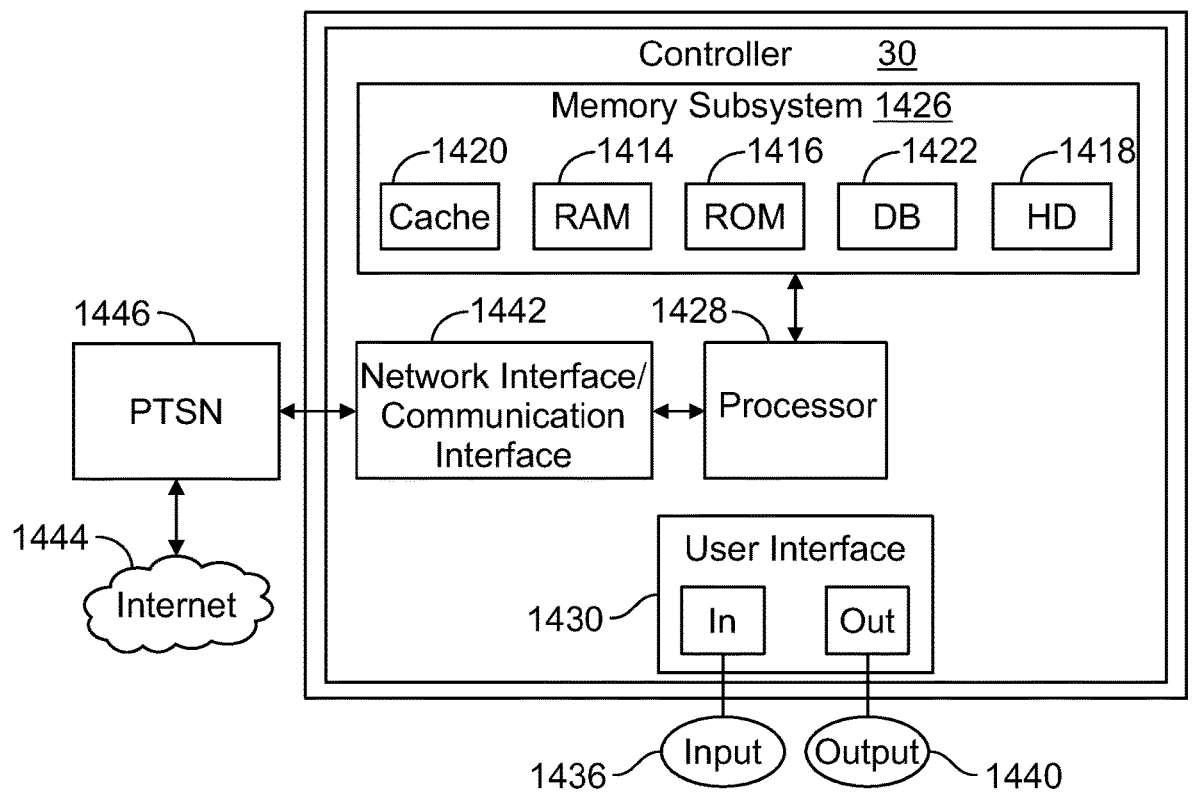
FIG. 15 depicts a high-level hardware block diagram of a system computer or controller.

Turning now to FIG. 15, a high-level hardware block diagram of a system computer or controller 30 is shown that may be used to execute software or logic to implement the apparatus 20 for cutting the unshaped three-dimensional meat products 31 into blocks of meat 40.

The system for cutting unshaped three-dimensional meat products 31 into blocks of meat 40 may be embodied as a system cooperating with computer hardware components and/or as computer-implemented methods. The system may include a plurality of software modules or subsystems. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network. The system may be embodied as a system cooperating with computer hardware components and/or as computer-implemented methods, and may include a plurality of software modules or subsystems.

The controller 300 may be a personal computer, work station, remote computer, server, and the like, and may include various hardware components, such as RAM 1414, ROM 1416, hard disk storage 1418, cache memory 1420, database storage 1422, and the like (also referred to as "memory subsystem 1426"). The controller 300 may include any suitable processing device 1428, such as a computer, microprocessor, RISC processor (reduced instruction set computer), CISC processor (complex instruction set computer), mainframe computer, work station, single-chip computer, distributed processor, server, controller, microcontroller, discrete logic computer, and the like, as is known in the art. For example, the processing device 1428 may be an Intel Pentium® microprocessor, x86 compatible microprocessor, or equivalent device, and may be incorporated into a server, a personal computer, or any suitable computing platform.

The system may also rely on co-processing/graphic devices such as graphical processing units (GPU's). GPU's allow the off-line learning to be heavily parallelized and make the process efficiently usable. GPU's may include, e.g., those that employ the NVIDIA CUDA architecture. The controller 300 may include one or more GPU's, which may be part of or integrated into the computer or processor, or may be separate commercially-available components, chips, or entire boards.

The memory subsystem 1426 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 1430 may be coupled to the controller 300 and may include various input devices 1436, such as switches selectable by the system manager and/or a keyboard. The user interface also may include suitable output devices 1440, such as an LCD display, a CRT, various LED indicators, a printer, and/or a speech output device, as is known in the art.

To facilitate communication between the controller 300 and external sources, a communication interface 1442 may be operatively coupled to the computer system. The communication interface 1442 may be, for example, a local area network, such as an Ethernet network, intranet, Internet, or other suitable network 1444. The communication interface 1442 may also be connected to a public switched telephone network (PSTN) 1446 or POTS (plain old telephone system), which may facilitate communication via the network 1444. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively, or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While the unshaped three-dimensional meat product 31 is described as being frozen, the unshaped three-dimensional meat product 31 can be fresh. In this situation, the fresh unshaped three-dimensional meat product does not necessarily need to be flattened in the first station 24 prior to scanning.

All of the steps of flattening, scanning, side strapping and docking do not need to be performed by the apparatus 20 to process the meat product 31. In an embodiment, the meat product 31 is only scanned (by the first station 24) and side strapped (by the second station 26) by the apparatus 20. In an embodiment, the meat product 31 is only flattened (by the first station 24), scanned (by the first station 24), and side strapped (by the second station 26) by the apparatus 20. In an embodiment, the meat product 31 is only scanned (by the first station 24) and docked (by the third station 24) by the apparatus 20. In an embodiment, meat product 31 is only flattened (by the first station 24), scanned (by the first station 24) and docked (by the third station 24) by the apparatus 20.

Unless defined otherwise, all technical and scientific terms used herein have the same meaning as commonly understood by one of skill in the art to which the disclosure pertains. Although any methods and materials similar to or equivalent to those described herein can be used in the practice or testing of the present disclosure, the preferred methods and materials are described herein.

While various examples of the disclosure have been described, it will be apparent to those of ordinary skill in the art that other examples and implementations are possible within the scope of the disclosure. Accordingly, the disclosure is not to be restricted except in light of the attached claims and their equivalents.

The invention claimed is:

1. An apparatus for processing meat product comprising:
   a first station including a scanner which is configured to scan features of a meat product;
   a second station configured to side strap the meat product in accordance with information received from the scan of the features, the second station comprising a support defining a longitudinal axis, and a blade assembly comprising spaced-apart knifes disposed on opposite sides of the support, the spaced-apart knifes having an axis of rotation that is normal to the longitudinal axis of the support, wherein a position of each knife relative to the support in a direction normal to the longitudinal axis can be varied; and
   a controller programmed to control movement of each knife in accordance with the information received from the scanner.

2. The apparatus of claim 1, wherein the position to which each knife is moved is performed under a rule-based decision process executed by the controller.

3. The apparatus of claim 1, wherein the second station further comprises an upstream conveyor upstream of the support and a downstream conveyor downstream of the support.

4. The apparatus of claim 3, wherein the second station further comprises a meat product engagement assembly disposed over at least one of the upstream and downstream conveyors and the support and which is configured to engage the meat product.

5. The apparatus of claim 4, wherein the meat product engagement assembly includes at least one clamp configured to move vertically, the at least one clamp further configured to move horizontally along longitudinal axes defined by the upstream and downstream conveyors.

6. The apparatus of claim 4, further comprising a lower trim conveyor disposed below the conveyors.

7. The apparatus of claim 1, wherein the scanner comprises a plurality of scanning modules configured to provide three-dimensional information regarding the meat product.

8. The apparatus of claim 1, wherein the first station is further configured to flatten the meat product.

9. The apparatus of claim 8, wherein the first station comprises a conveyor, a first stamp disposed parallel to and over the conveyor, the first stamp configured to move vertically towards and away from the conveyor, a second stamp disposed perpendicular to and over the conveyor, and a plate disposed perpendicular to the conveyor, the plate disposed parallel to the second stamp, the second stamp being configured to move horizontally towards and away from the plate.

10. The apparatus of claim 9, wherein the plate is configured to move vertically relative to the conveyor.

11. The apparatus of claim 9, wherein the second stamp is configured to contact the first stamp in order to move the first stamp horizontally with the second stamp.

12. The apparatus of claim 9, wherein the first stamp is configured to contact the plate in order to move the plate vertically with the first stamp.

13. The apparatus of claim 9, wherein the scanner includes at least one scanning modules located above a gap at a downstream end of the conveyor, and at least one scanning modules located below the gap.

14. The apparatus of claim 13, wherein the scanning modules are configured to provide three-dimensional information regarding the meat product to the controller.

15. The apparatus of claim 1, further comprising a third station configured to dock front and rear ends of the meat product, the third station including a conveyor downstream of the support and a knife having an axis of rotation which is parallel to the support, wherein the controller is programmed to control movement of the conveyor of the third station in accordance with the information received from the scanner.

16. The apparatus of claim 15, wherein the third station includes a pair of knives which are driven by a common actuator.

17. The apparatus of claim 16, wherein one of the knives of the third station is upstream of the conveyor of the third station and the other knife of the third station is downstream of the conveyor of the third station, and the third station further comprises a second conveyor downstream of the conveyor between the knives of the third station, and an upstream gap is provided at an upstream end of the conveyor between the knives of the third station and a downstream gap is provided at a downstream end of the conveyor between the knives of the third station, wherein one of the spaced-apart knives is configured to move into and out of the upstream gap and another of the spaced-apart knives is configured to move into and out of the downstream gap.

18. The apparatus of claim 17, wherein the third station further comprises upstream and downstream meat product engagement assemblies, the upstream meat product engagement assembly positioned over the downstream conveyor of the second station and configured to engage with the meat product, the downstream meat product engagement assembly positioned over of the second conveyor of the third station and configured to engage with the meat product.

19. The apparatus of claim 15, wherein the second station is directly downstream of the first station, and the third station is directly downstream of the second station.

20. The apparatus of claim 15, wherein the third station is directly downstream of the first station, and the second station is directly downstream of the third station.

21. The apparatus of claim 15, wherein the third station further comprises at least one sensor which is configured to sense when the meat product is in a position to dock front or rear ends of the meat product.

22. The apparatus of claim 15, further comprising a scanning module downstream of the scanner and configured to capture information regarding cutting of the meat product by the second station, wherein the controller is programmed to, based on the captured information, adjust parameters of the second and third stations for subsequent meat product.

23. The apparatus of claim 15, wherein the conveyor of the third station is movable between a position horizontally in line with the downstream conveyor of the second station and a position which is not horizontally in line with the downstream conveyor of the second station.

24. The apparatus of claim 15, further comprising a lower trim conveyor disposed below the conveyor of the third station.

25. A method of operating an apparatus for processing meat product comprising:
scanning meat product for features thereof;
moving a first knife toward a support over which the meat product passes, the first knife being moved to a position based upon information received from the scanning, the first knife being moved in a direction perpendicular to a longitudinal axis of the support;
moving a second knife toward the support, the second knife being moved to a position based upon information received from the scanning, the second knife being moved in a direction perpendicular to a longitudinal axis of the support and independently of movement of the first knife, wherein blades of the first and second knives are parallel to each other; and
moving the meat product over the support in a longitudinal direction along the longitudinal axis of the support while rotating the knives to cut sides of the meat product.

26. The method of claim 25, wherein the position to which each knife is moved is performed under a rule-based decision process executed by a controller.

27. The method of claim 25, further comprising flattening the meat product prior to scanning.

28. The method of claim 27, further comprising docking front and rear ends of the flattened meat product.

29. The method of claim 25, further comprising docking front and rear ends of the meat product.

30. The method of claim 29, wherein the docking of the front and rear ends of the meat product is performed after the sides of the meat product are cut.

31. The method of claim 29, wherein the docking of the front and rear ends of the meat product is performed before the sides of the meat product are cut.

32. An apparatus for side strapping a meat product comprising:
a support defining a longitudinal axis;
a blade assembly comprising spaced-apart knifes disposed on opposite sides of the support, the spaced-apart knifes having an axis of rotation that is normal to the longitudinal axis of the support, wherein a position of each knife relative to the support in a direction normal to the longitudinal axis can be varied; and
a controller programmed to control movement of each knife.

33. The apparatus of claim 32, wherein the position to which each knife is moved is performed under a rule-based decision process executed by the controller.

34. The apparatus of claim 32, further comprising an upstream conveyor upstream of the support and a downstream conveyor downstream of the support.

35. The apparatus of claim 34, further comprising a meat product engagement assembly disposed over the upstream and downstream conveyors and the support, the meat product engagement assembly including at least one clamp configured to move vertically towards and away from the upstream and downstream conveyors and the support, the at least one clamp further configured to move horizontally along longitudinal axes of the upstream and downstream conveyors.

* * * * *